United States Patent
Soryal et al.

(10) Patent No.: US 11,520,860 B2
(45) Date of Patent: Dec. 6, 2022

(54) INTELLIGENT CONTINUOUS AUTHENTICATION FOR DIGITAL RIGHTS MANAGEMENT

(71) Applicant: AT&T Intellectual Property I, L.P., Atlanta, GA (US)

(72) Inventors: Joseph Soryal, Glendale, NY (US); Dylan Reid, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 17/187,657

(22) Filed: Feb. 26, 2021

(65) Prior Publication Data
US 2022/0277059 A1    Sep. 1, 2022

(51) Int. Cl.
*H04L 29/06* (2006.01)
*G06F 21/10* (2013.01)
*G06F 21/44* (2013.01)

(52) U.S. Cl.
CPC .............. *G06F 21/10* (2013.01); *G06F 21/44* (2013.01)

(58) Field of Classification Search
CPC .................................. G06F 21/10; G06F 21/44
See application file for complete search history.

(56) References Cited

U.S. PATENT DOCUMENTS

| | | | |
|---|---|---|---|
| 2010/0077486 A1* | 3/2010 | Qu | G06F 21/10 726/28 |
| 2011/0320819 A1* | 12/2011 | Weber | H04L 9/3215 713/168 |
| 2013/0179695 A1* | 7/2013 | Zollinger | H04L 9/0866 713/189 |
| 2013/0347025 A1* | 12/2013 | Prakash | H04N 21/25875 725/25 |

\* cited by examiner

*Primary Examiner* — Jason K Gee
(74) *Attorney, Agent, or Firm* — Hartman & Citrin LLC

(57) ABSTRACT

The concepts and technologies disclosed herein are directed to intelligent continuous authentication ("ICA") for digital rights management ("DRM"). A user device can receive a notification that a media content playback device has requested playback of a media file that is protected by an ICA engine ("ICAE") instance. The user device can request a unique code from the media content playback device. The user device can provide the unique code to an ICAE central management system associated with a media content provider that provides media content encompassed in the media file. The user device can determine, based upon a result provided by the ICAE central management system, whether the unique code is valid or invalid. The user device can instruct the ICAE instance to enable or disable the media file based upon whether the unique code is valid or invalid.

20 Claims, 13 Drawing Sheets

INTELLIGENT CONTINUOUS AUTHENTICATION FOR DIGITAL RIGHTS MANAGEMENT

BACKGROUND

In recent years, the use of video and music streaming services has increased dramatically. Streaming service providers typically offer a variety of plans to meet the needs of their customers in terms of cost, the number of devices that can stream at the same time, the number of devices that can download content (e.g., for use offline), the amount of content that can be streamed, and the quality of the streamed content. Some customers may decide to bypass certain account restrictions and share their login credentials (e.g., username and password) with other individuals. This practice, commonly referred to as password or account sharing, has resulted in substantial revenue losses for many streaming service providers. Other forms of illegal streaming and content capturing (e.g., unauthorized download) result in additional revenue losses. Unfortunately, due to the proliferation of account misuse such as by password sharing, streaming service providers must employ additional security mechanisms to mitigate revenue losses and to fulfill contractual obligations with media content owners. While these security mechanisms are necessary, implementing them can lead to frustration among good customers.

In addition to account restrictions, many streaming service providers implement some form of digital rights management ("DRM") to prevent unauthorized access to content. DRM broadly encompasses technologies that control access to digital content such as music, movies, television shows, video games, and the like. Streaming service providers may be required to implement DRM to ensure compliance with license agreements with content owners. Implementations of DRM should balance providing a consistent user experience that avoids unnecessary interruptions and upholding any license agreements that are in place.

SUMMARY

Concepts and technologies disclosed herein are directed to intelligent continuous authentication ("ICA") for DRM. According to one aspect of the concepts and technologies disclosed herein, a user device can include a processor and a memory. The memory can store instructions associated with a device-side ICA engine ("ICAE") management application. The processor can execute the instructions associated with the device-side ICAE management application to perform operations. In particular, the user device can receive a notification that a media content playback device has requested playback of a media file that is protected by an ICAE instance. The user device can request a unique code from the media content playback device. The unique code can be associated with the ICAE instance and the media file. The user device can provide the unique code to an ICAE central management system associated with a media content provider that provides media content encompassed in the media file. The user device can determine, based upon a result provided by the ICAE central management application, whether the unique code is valid or invalid. The user device can instruct the ICAE instance to enable or disable the media file based upon whether the unique code is valid or invalid.

In some embodiments, the user device can receive the notification from the media content playback device. In other embodiments, the user device can receive the notification from a content delivery network ("CDN") that is configured to deliver the media file to the media content playback device. The CDN can provide the media file for download by the user device. The CDN alternatively or additionally can provide the media file for streaming by the user device. In other embodiments, the user device can receive the notification from an ICAE central management system associated with a media content provider that provides the media file.

In some embodiments, the unique code is pre-generated by an external entity. The external entity may be a CDN that includes a server executing a CDN-side ICAE management application. The external entity alternatively may be an ICAE central management system executing an ICAE central management application. The ICAE central management system can be associated with the media content provider that provides the media file.

In some embodiments, the unique code can include a static code. In other embodiments, the unique code can include a dynamic code. A dynamic unique code can be changed periodically, changed based upon a schedule, or changed randomly/pseudo-randomly. The unique code can be associated with a single playback session or multiple playback sessions of the media file.

In some embodiments, the user device can instruct the ICAE instance to disable the media file based upon the unique code being invalid by instructing the ICAE instance to delete the media file. In other embodiments, the user device can instruct the ICAE instance to disable the media file based upon the unique code being invalid by instructing the ICAE instance to interrupt the media content playback device from streaming the media file. In other embodiments, the user device can instruct the ICAE instance to disable the media file based upon the unique code being invalid by instructing the ICAE instance to render the media file unplayable. In some other embodiments, the user device can instruct the ICAE instance to disable the media file based upon the unique code being invalid by instructing the ICAE instance to render the media file unrecognizable during playback.

In addition or as an alternative to the unique code, the user device can determine its location (i.e., a user device location) and can request that the media content playback device provide its location (i.e., a media content playback device location). The user device can compare the user device location and the media content playback device location to determine whether a location discrepancy exists. The location discrepancy can be defined, at least in part, by one or more location rules.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
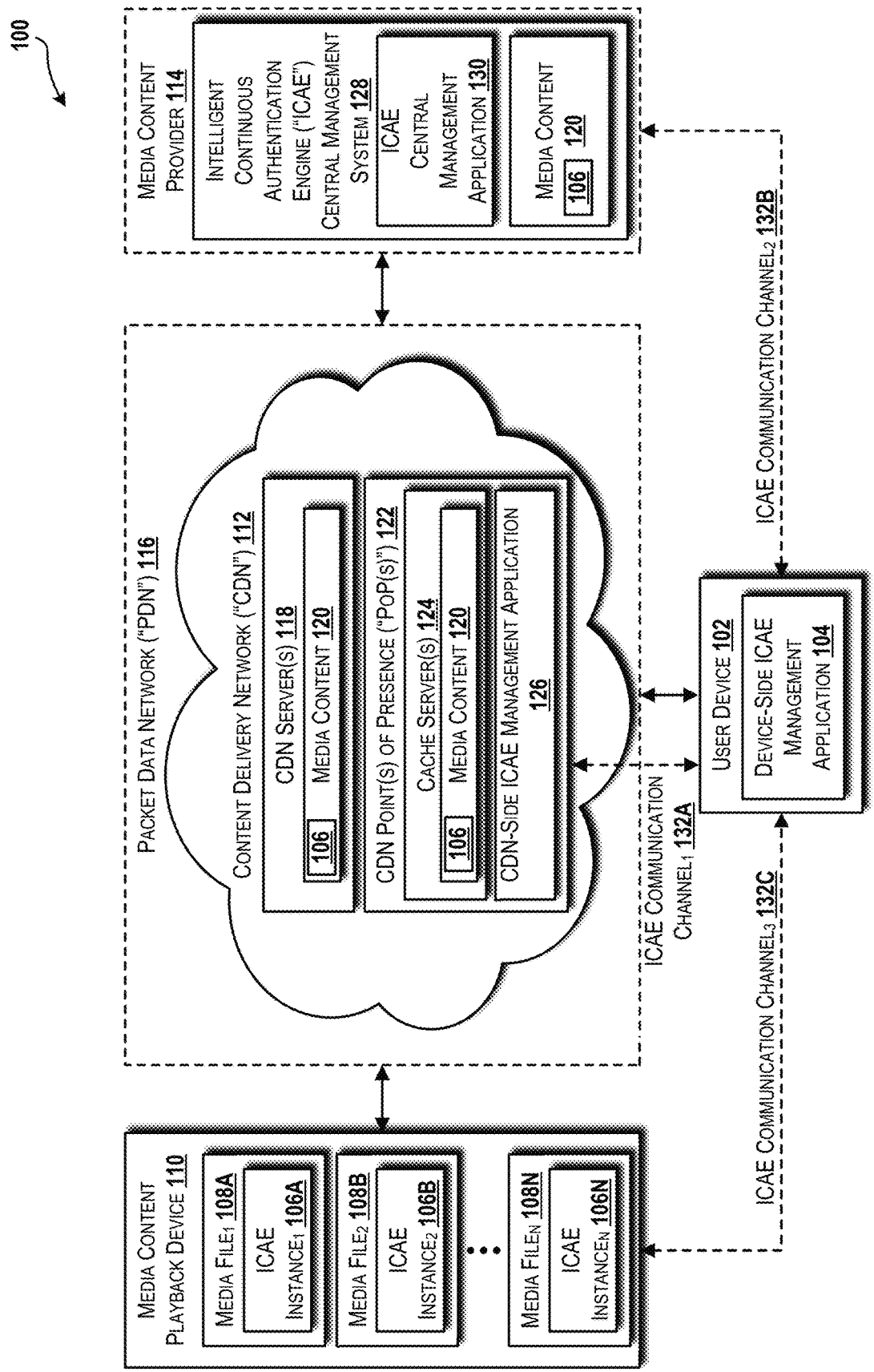
FIG. 1 is a block diagram illustrating an illustrative operating environment in which the concepts and technologies disclosed herein can be implemented.

Turning now to FIG. 1, an operating environment 100 in which the concepts and technologies disclosed herein can be implemented will be described, according to an illustrative embodiment. The operating environment 100 includes a user device 102 that is capable of executing a device-side intelligent continuous authentication engine ("ICAE") management application 104 to manage ICAE instances 106A-106N (hereinafter referred to collectively as ICAE instances 106 or individually as ICAE instance 106) associated with media files 108A-108N (hereinafter referred to collectively as media files 108 or individually as media file 108) that can be played by a media content playback device 110. The user device 102 can be a smartphone, a laptop or other traditional computer, a tablet, a video game system, an Internet of Things ("IoT") device, or other computing device that includes at least one processor capable of executing the device-side ICAE management application 104 to perform operations described herein. Alternatively, the user device 102 can be a dedicated device with the device-side ICAE management application 104 being the only application, part of a limited application base, implemented as firmware, or implemented as part of an operating system. The user device 102 can download and install the device-side ICAE management application 104 from an application marketplace or website, although physical media such as universal serial bus ("USB") storage, disc-based media, and cartridge (including proprietary cartridges) are contemplated. The device-side ICAE management application 104 may be a standalone application or the functionality thereof may be built-in to another application or the operating system of the user device 102.

The ICAE instances 106 can be implemented as part of or separate from the media files 108. In some embodiments, the ICAE instance 106 is embedded in the media file 108. In other embodiments, the ICAE instance 106 is attached, appended, or otherwise associated with the media file 108. The ICAE instance 106 can be or can include a self-executing file that executes whenever the media file 108 is played. In some embodiments, the ICAE instance 106 is implemented as a microservice.

The media files 108 can include audio, video, or a combination thereof, and may take the form of music, sound effects, dialogue, audio books, movies, television shows, documentaries, video games, user-created content (e.g., YOUTUBE, TWITCH, and the like), any combination thereof, and/or the like. Moreover, the media files 108 may be downloadable files, streaming files, or portions thereof.

The media content playback device 110 can be a smartphone, a laptop or other traditional computer, a tablet, a video game system, an IoT device, a television, or other computing device that includes at least one processor capable of playing the media files 108. Alternatively, the media content playback device 110 can be a device dedicated to playback of the media files 108.

The ICAE management application 104 can coordinate with the ICAE instances 106 when the media files 108 are played. The ICAE management application 104 and the ICAE instances 106 can share precise location information that can be compared to determine a proximity of the user device 102 to the media content playback device 110. In some embodiments, one or more rules can be established to ensure that the user device 102 and the media content playback device 110 are within a specific proximity of each other prior to permitting playback of the media files 108. The ICAE management application 104 can obtain its location information from a global positioning system ("GPS") and/or other location component(s) (best shown in FIG. 9) of the user device 102. The ICAE instance 106 can obtain its location information from a GPS and/or other location component(s) of the media content playback device 110, via an Internet service provider (e.g., via IP address), via cellular signal, or via short-range communication (e.g., BLUETOOTH or near-field communications) with the user device 102. Distance measurements can be estimated through the use of signal strength measurements taken by both the user device 102 and the media content playback device 110.

The media file 108 can be provided to the media content playback device 110 via a content delivery network ("CDN") 112 operating as part of a packet data network ("PDN") 116, such as the Internet. The CDN 112 can include one or more CDN servers 118 that can store media content 120 (or cause the media content 120 to be stored) provided by a media content provider 114. The media content provider 114 may be the owner of the media content 120 (e.g., a musician, record company, video game developer or publisher, or film studio). The media content provider 114 alternatively may be a service (e.g., a video or music streaming service) that provides the media content 120 to the CDN 112, and the media content 120 may be owned by another entity. The media content 120 stored by the CDN servers 118 can include a master copy from which the media files 108 can be created and distributed. The CDN 112 can serve the media content 120 to the media content playback device 110 through various CDN points of presence ("PoPs") 122 (hereinafter collectively referred to as CDN PoPs 122 or individually as CDN PoP 122), which can be geographically-distributed to accommodate efficient and low latency distribution of the media content 120 to the media content playback device 110 and similar devices (not shown) throughout a geographical region. The CDN PoPs 122 can store the media content 120 in one or more cache servers 124 that can be updated as needed by the CDN server(s) 118 to ensure the latest media content 120 is available to the geographical regions served by the CDN PoPs 122. For example, the CDN 112 may have one CDN PoP 122 with one or more cache servers 124 located in the southeast with another CDN PoP 122 with one or more cache servers 124 located in the northeast, or multiple CDN PoPs 122 each with one or more cache servers 124 in each area. The number of CDN PoPs 122 that serve the media content 120 can be determined by the CDN 112 based upon the needs of the media content provider 114. Moreover, although a CDN distribution infrastructure is illustrated and described herein, a centralized distribution infrastructure is also contemplated, such as distribution directly from the media content provider 114. Accordingly, the concepts and technologies disclosed herein should not be construed as being limited to implementations that involve the CDN 112.

The CDN PoP 122 can include a CDN-side ICAE management application 126 that can manage the ICAE instances 106 and the delivery thereof to the media content playback device 110. Implementations of the CDN 112 that do not utilize the CDN PoP(s) 122 can include the CDN-side ICAE management application 126, which can be executed by the CDN server 118 or other system (not shown). In the illustrated embodiment, the CDN-side ICAE management application 126 can be executed by the cache server 124 or other system (not shown). The CDN-side ICAE management application 126 can consult with an ICAE central management system 128, and particularly, an ICAE central management application 130 that is executed by the ICAE central management system 128, to obtain the ICAE instances 106. In some embodiments, the ICAE instances 106 are created by the ICAE central management application 130 and embedded, attached, appended, or otherwise associated with the media content 120. In some other embodiments, the ICAE instances 106 are created by the CDN-side ICAE management application 126 based upon ICAE information that can be used by the CDN-side ICAE management application 126 to create the ICAE instances 106. The ICAE central management application 130 and the CDN-side ICAE management application 126 can coordinate to keep the ICAE instances 106 up-to-date.

The CDN-side ICAE management application 126 can communicate with the device-side ICAE management application 104 via an ICAE communication channel$_1$ 132A, which can be established via an appropriate connection between the user device 102 and the CDN PoP 122 via the PDN 116. For example, the connection may be established via cellular, landline, or satellite-based technologies.

The device-side ICAE management application 104 can communicate with the ICAE central management system 128 via another ICAE communication channels 132B, which can be established via an appropriate connection between the user device 102 and the ICAE central management system 128 via the PDN 116. For example, the connection may be established via cellular, landline, or satellite-based technologies.

The ICAE instances 106 can communicate with the device-side ICAE management application 104 via another ICAE communication channel$_3$ 132C. Depending upon the needs of a given implementation, the ICAE communication channel$_3$ 132C may be established over a BLUETOOTH connection, a WI-FI connection, or another local or short-range connection such as proprietary RF or NFC, or over the PDN 116, access to which may be provided to the media content playback device 110 and the user device 102 by a wireless access network (not shown) implemented using a cellular access technology, for example.

The ICAE instance 106 can include a security key that controls access to particular media content 120 such as one of the media files 108. For example, the ICAE instance$_1$ 106A can control access to the media file$_1$ 108A, the ICAE instance$_2$ 106B can control access to the media file$_2$ 108B, and the ICAE instance$_N$ 106N can control access to the media file$_N$ 108N. If the media file 108 is streamed to the media content playback device 110, the CDN-side ICAE management application 126 can first send the corresponding ICAE instance 106 to the media content playback device 110. The ICAE instance 106 can coordinate with the device-side ICAE management application 104 to determine whether the media file 108 should be played. This determination can be a one-time determination in which the ICAE instance 106 requests permission from the device-side ICAE management application 104 to allow playback of the media file 108. This determination alternatively can be dynamic and continuous, periodic, or based on some other schedule.

In some embodiments, the ICAE instance 106 can provide the device-side ICAE management application 104 with a unique code. The device-side ICAE management application 104 can share with the ICAE central management application 130 that, in turn, can check whether the unique code is the same as the unique code assigned to that particular ICAE instance 106 and can report back to the device-side ICAE management application 104. If the unique code is the same, the device-side ICAE management application 104 can instruct the ICAE instance 106 to allow the media content playback device 110 to play the media file 108. If the unique code is not the same, the device-side ICAE management application 104 can instruct the ICAE instance 106 to disable the media file 108 so that the media content playback device 110 cannot play the media file 108.

The ICAE instance 106 can notify the device-side ICAE management application 104 when playback of the media file 108 begins, after which the device-side ICAE management application 104 can query the ICAE instance 106 periodically (e.g., every X minutes), based on some other schedule, or randomly/pseudo-randomly. The ICAE instance 106 can share with the device-side ICAE management application 104 the unique code that has been assigned to the ICAE instance 106. If the unique code is unavailable or has changed without permission, the device-side ICAE management application 104 can instruct the ICAE instance 106 to disable playback of the media file 108. The ICAE instance 106 can be associated with the unique code that was pre-generated by an external entity, such as the CDN-side ICAE management application 126, or the ICAE central management system 128 via the ICAE central management application 130. Alternatively, the ICAE instance 106 may coordinate with the CDN-side ICAE management application 126 and/or the ICAE central management application 130 to obtain the unique code after receiving a request from the device-side ICAE management application 104. The unique code can be static and assigned to the ICAE instance 106 associated with the media file 108 for which playback has been requested. The unique code can be a dynamic code that changes over time. The unique code can be changed periodically, changed based upon a schedule, or changed randomly/pseudo-randomly. The unique code can be associated with a single playback session or multiple playback sessions of the media file 108.

In some embodiments, the ICAE instance 106 can perform continuous decryption of the media file 108 as it is received from the CDN 112, such as when the media content playback device 110 streams the media file 108 from the CDN 112. If the correct ICAE instance 106 for the media file 108 is not installed on the media content playback device 110, then the media content playback device 110 cannot decrypt the media file 108. The ICAE instance 106 can use a static security key, although additional security can be provided using a dynamic security key that can be changed by the ICAE instance 106 through coordination with the ICAE central management system 128 and/or the device-side ICAE management application 104.

The ICAE instances 106 can be used in addition to existing authentication techniques, such as a hardware signature utilized for authentication with a user's password. The ICAE instances 106 alternatively can be used as a standalone form of authentication. The ICAE instances 106 can effectively restrict playback of the media files 108 based upon the proximity of the media content playback device 110 to the user device 102 executing the device-side ICAE management application 104. In some embodiments, the device-side ICAE management application 104 can learn, over time, the location pattern(s) of the user device 102 and/or the media content playback device 110. The media content playback device 110, embodied as a stationary device such as smart television, may be associated with a static location (e.g., the user's home), while the user device 102 may be associated with a dynamic location that changes over time but may be predictable based on the user's travel habits (e.g., travel from home to work and back home during weekdays). The ICAE instance 106 may at first restrict playback of the media file 108 on the media content playback device 110 if the user device 102 is not within communication range to establish the ICAE communication channel₃ 132C over BLUETOOTH or other short-range communication technology. Over time, however, the device-side ICAE management application 104 may learn, for example, that during weekdays the user leaves the user device 102 (e.g., their smartphone) in their vehicle parked outside but watches the media file 108 on the media content playback device 110 (e.g., a television) that is stationary in their living room. Since the location patterns of both the media content playback device 110 and the user device 102 are consistent during weekdays, the device-side ICAE management application 104 can allow the ICAE instance 106 to enable playback of the media file 108. If, however, the location of the user device 102 deviates from this location pattern (e.g., the user device 102 is located in another state while the user is traveling) when the media content playback device 110 plays the media file 108, the device-side ICAE management application 104 may notify the user and request approval for playback (e.g., approval for a family member to watch the media content 120 on the media content playback device 110). It should be understood that the media content playback device 110 may be mobile and the user device 102 may be stationary so as to prevent playback of the media file when the media content playback device 110 is outside a pre-determined distance from the user device 102.

If the user device 102 is powered off, the ICAE instance 106 can continue to run on the media content playback device 110. When the user device 102 is powered on, the ICAE management application 104 can request an update from the ICAE instance 106 with regard to whether the media file 108 was played during the time the user device 102 was powered off. The ICAE management application 104 can determine whether to continue to allow the media content playback device 110 to playback the media file 108. The ICAE management application 104 can reach out to a media content provider 114 associated with the media file 108 to determine how to proceed with regard to permitting the media content playback device 110 to playback the media file 108.

Although the illustrated operating environment 100 shows one user device 102, one device-side ICAE management application 104, one media content playback device 110, one media content provider 114, one CDN 112, one PDN 116, one CDN-side ICAE management application 126, one ICAE central management system 128, and one ICAE central management application 130, the operating environment 100 may include multiple device-side ICAE management applications 104, multiple media content playback devices 110, multiple media content providers 112, multiple CDNs 114, multiple PDNs 116, multiple CDN-side ICAE management applications 126, multiple ICAE central management systems 128, multiple ICAE central management applications 130, or some combination thereof. Accordingly, the illustrated embodiment of the operating environment 100 should not be construed as being limiting in any way.

Figure 2:
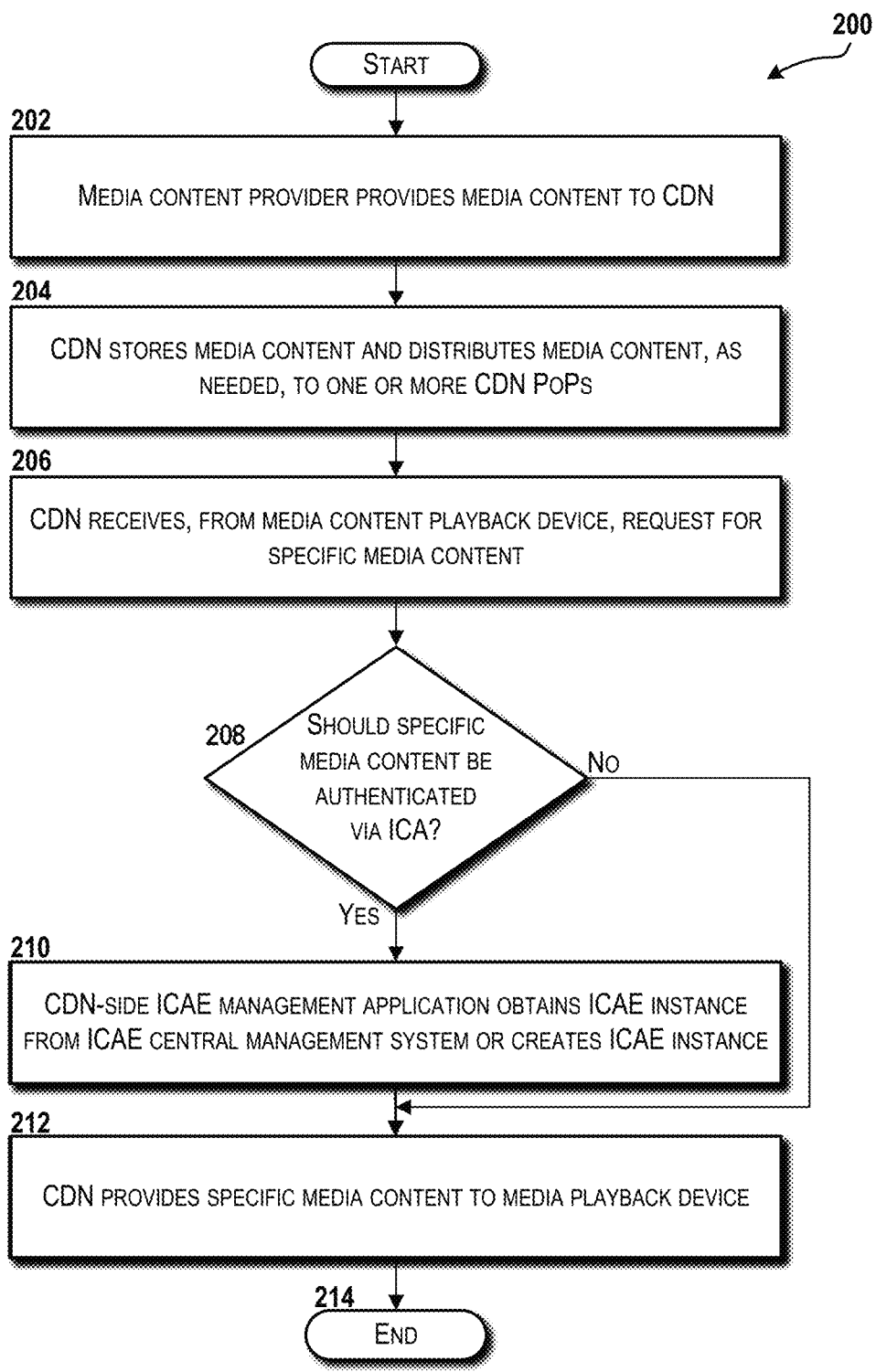
FIG. 2 is a flow diagram illustrating a method for intelligent continuous authentication ("ICA") for DRM, according to an illustrative embodiment of the concepts and technologies disclosed herein.

Turning now to FIG. 2, aspects of a method 200 for ICA for DRM will be described, according to an illustrative embodiment of the concepts and technologies disclosed herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multiprocessor systems, distributed computing systems, minicomputers, mainframe computers, personal computers, hand-held computing devices, microprocessor-based, programmable consumer electronics, network nodes, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 will be described with additional reference to FIG. 1. The method 200 begins and proceeds to operation 202. At operation 202, the media content provider 114 provides the media content 120 to the CDN 112. The media content 120 can include audio, video, or a combination thereof, and may take the form of music, sound effects, dialogue, audio books, movies, television shows, documentaries, video games, user-created content (e.g., YOUTUBE, TWITCH, and the like), any combination thereof, and/or the like. The media content 120 can be provided to the CDN 112 in one or more formats capable of being played by the media content playback device 110 as the media files 108. Moreover, the media content 120 can be compatible with the codec(s) used by the media content playback device 110. The media content 120 can be configured for download to the media content playback device 110 and/or streamed to the media content playback device 110. Although the embodiment illustrated in FIG. 1 shows a single CDN 112, the media content provider 114 may provide the media content 120 to multiple CDNs 112.

From operation 202, the method 200 proceeds to operation 204. At operation 204, the CDN 112 stores the media content 120 at one or more of the CDN servers 118. The CDN 112 can store the media content 120 locally (e.g., as a master copy). Also at operation 204, the CDN 112 can distribute the media content 120 to one or more of the CDN PoPs 122. The CDN PoPs 122, in turn, can store the media content 120 at one or more of the cache servers 124 for distribution to the media content playback device 110 upon request. The CDN servers 118 and/or the cache server(s) 124 can cause the media content 120 to be stored elsewhere such as in a database or other data storage, which may be part of the CDN server(s) 118 and/or the cache server(s) 124 or in communication therewith.

From operation 204, the method 200 proceeds to operation 206. At operation 206, the CDN 112 receives, from the media content playback device 110, a request for specific media content of the media content 120 (referred to hereinafter for the method 200 and others, at times, as "specific media content 120"). In some embodiments, the media content playback device 110 may request the specific media content 120 from a website accessed by the media content playback device 110 through a web browser or a native application executed by the media content playback device 110. The request may be to download or stream the media content 120. The request may default to either of these options. For example, all requests from a streaming application may be for streaming the specific media content 120 by default. The CDN 112 can be configured to serve only downloadable content, only streaming content, or both based upon the needs of the media content provider 114. Additional details about the specific media content 120 may include resolution, frame rate, bitrate, and the like. These may be specified in the request and/or regulated by the CDN 112.

From operation 206, the method 200 proceeds to operation 208. At operation 208, the CDN-side ICAE management application 126 determines if the specific media content 120 should be authenticated via ICA. This determination may be made locally by the CDN-side ICAE management application 126 or by consulting with the ICAE central management application 130 associated with the media content provider 114. The former is further described herein with reference to method 300 illustrated in FIG. 3, and the latter is described herein with reference to method 400 illustrated in FIG. 4. If the CDN-side ICAE management application 126 determines that the specific media content 120 is to be authenticated via ICA, the method 200 proceeds to operation 210. At operation 210, the CDN-side ICAE management application 126 can obtain the ICAE instance 106 from the ICAE central management system 128. Alternatively, at operation 210, the CDN-side ICAE management application 126 can create the ICAE instance 106 based upon a configuration specified by the CDN-side ICAE management application 126.

From operation 210, the method 200 proceeds to operation 212. At operation 212, the CDN 112, in response to the request, provides the specific media content 120 to the media content playback device 110. The CDN 112 may provide the ICAE instance 106 embedded in the specific media content 120, attached to the specific media content 120, appended to the specific media content 120, or otherwise associated with the specific media content 120 (e.g., provided to the media content playback device 110 prior to the specific media content 120). The CDN 112 may provide the ICAE instance 106 along with the specific media content 120 or separately. From operation 212, the method 200 proceeds to operation 214. At operation 214, the method 200 can end.

Returning to operation 208, if the CDN-side ICAE management application 126 determines that the specific media content 120 should not be authenticated via ICA, the method 200 proceeds directly to operation 212. The method 200 then proceeds as described above.

Figure 3:
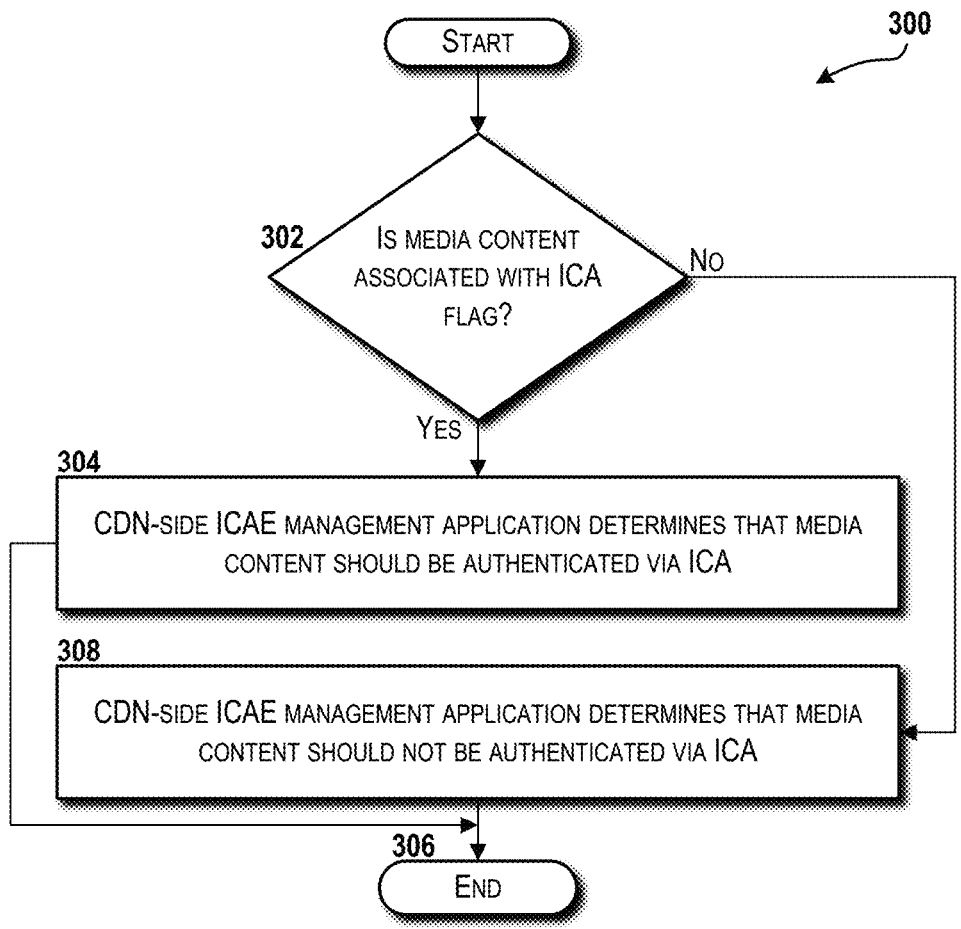
FIG. 3 is a flow diagram illustrating a method for determining whether specific media content should be authenticated via ICA, according to an illustrative embodiment of the concepts and technologies disclosed herein.

Turning now to FIG. 3, a flow diagram illustrating a method 300 for determining whether specific media content 120 should be authenticated via ICA will be described, according to an illustrative embodiment of the concepts and technologies disclosed herein. The method 300 will be described with additional reference to FIG. 1. The method 300 can be performed as part of operation 208 of the method 200 described above with reference to FIG. 2.

The method 300 begins and proceeds to operation 302. At operation 302, the CDN-side ICAE management application 126 checks the specific media content 120 for an ICA flag. If the specific media content 120 is associated with an ICA flag, the method 300 proceeds to operation 304. At operation 304, the CDN-side ICAE management application 126 determines that the specific media content 120 should be authenticated via ICA. The method 300 then proceeds to operation 306 and the method 300 can end. If the specific media content 120 is not associated with an ICA flag, the method 300 proceeds to operation 308. At operation 308, the CDN-side ICAE management application 126 determines that the specific media content 120 should not be authenticated via ICA. The method 300 then proceeds to operation 306 and the method 300 can end.

The method 300 can be a sub-method of the method 200 described above. In particular, the output of the method 300 (i.e., a determination that the specific media content 120 should or should not be authenticated via ICA) can be used in the determination operation 208 described above in context of the method 200.

In some embodiments, the media content provider 114 can instruct the CDN 112 to associate the ICA flag with specific content of the media content 120, certain types of the media content 120, or all of the media content 120. In some other embodiments, the media content provider 114 can associate the media content 120 with an ICA flag prior to sending the media content 120 to the CDN 112. The ICA flag can be embodied in various forms. A filename for the media content 120 may be used by the media content provider 114 to notify the CDN 112 that the media content 120 associated with that filename is to be authenticated via ICA. For example, media content name ICA or other filename notation may be used as an ICA flag. A file property may be used to enable/disable an ICA flag. In this case, the media content provider 114 can enable/disable the ICA flag and may lock the property so that another entity (e.g., the CDN 112) cannot change the ICA flag. The media content provider 114 can associate the media content 120 with an ICA flag via a database association. For example, a database that contains a reference to the media content 120 may associate that reference with an ICA flag. In this case, the CDN 112 can check the database to determine whether the reference is associated with the ICA flag. The database may be maintained by the CDN 112 and/or the media content provider 114.

Figure 4:
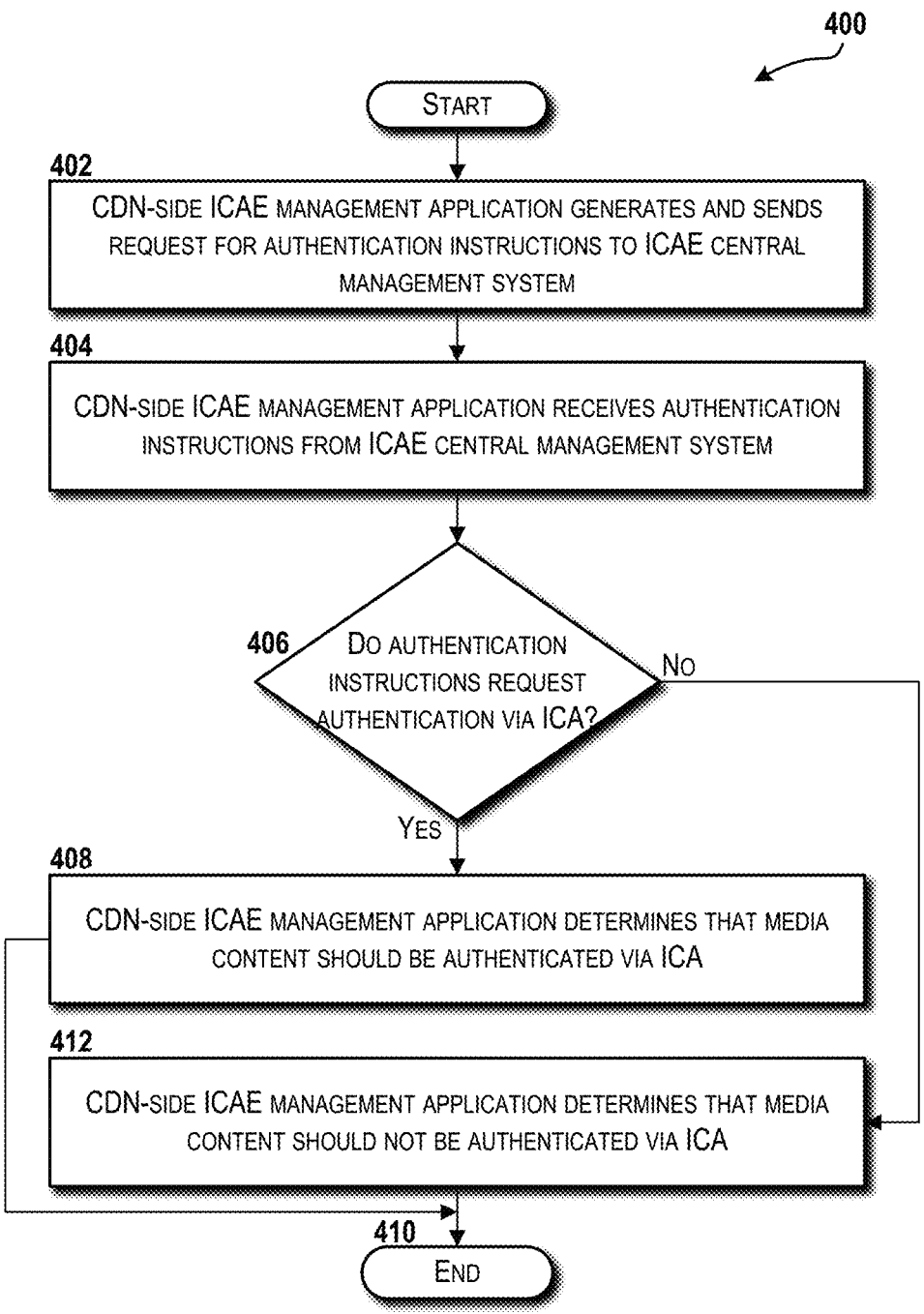
FIG. 4 is a flow diagram illustrating another method for determining whether specific media content should be authenticated via ICA, according to an illustrative embodiment of the concepts and technologies disclosed herein.

Turning now to FIG. 4, a flow diagram illustrating another method 400 for determining whether specific media content 120 should be authenticated via ICA will be described, according to an illustrative embodiment of the concepts and technologies disclosed herein. The method 400 will be described with additional reference to FIG. 1. The method 400 can be performed as part of operation 208 of the method 200 described above with reference to FIG. 2.

The method 400 begins and proceeds to operation 402. At operation 402, the CDN-side ICAE management application 126 generates and sends a request for authentication instructions to the ICAE central management system 128. The request can identify the specific media content 120 for which the request is made. The ICAE central management system 128 can receive and parse the request to identify the specific media content 120 and can perform a look-up operation (e.g., via a database or other data structure) to determine whether the specific media content 120 should be authenticated via ICA.

In some embodiments, the request can identify an account associated with the media content playback device 110 that originally requested the specific media content 120. The ICAE central management system 128 can use ICA on the media content 120 requested by certain accounts. The ICAE central management system 128 can use ICA on the media content 120 requested by certain devices associated with an account. The ICAE central management system 128 can respond to the request with authentication instructions. In some embodiments, the authentication instructions can include a simple yes or no, true or false, or similar indication that can be used by the CDN-side ICAE management application 126 to determine whether the specific media content 120 should be authenticated via ICA. In some other embodiments, the authentication instructions can include the ICAE instance 106 to be used (e.g., as part of operation 210 in the method 200 or as an alternative operation). The authentication instructions, in other embodiments, can include configuration information to enable the CDN-side ICAE management application 126 to create the ICAE instance 106 (e.g., as part of operation 212 in the method 200 or as an alternative operation).

From operation 402, the method 400 proceeds to operation 404. At operation 404, the CDN-side ICAE management application 126 receives the authentication instructions from the ICAE central management system 128. From operation 404, the method 400 proceeds to operation 406. At operation 406, the CDN-side ICAE management application 126 determines whether the authentication instructions request authentication of the specific media content 120 via ICA. If the CDN-side ICAE management application 126 determines that the authentication instructions request authentication of the specific media content 120, the method 400 proceeds to operation 408. At operation 408, the CDN-side ICAE management application 126 determines that the specific media content 120 should be authenticated via ICA. The method 400 then proceeds to operation 410 and the method 400 can end. If the CDN-side ICAE management application 126 determines that the authentication instructions do not request authentication of the specific media content 120, the method 400 proceeds to operation 412. At operation 412, the CDN-side ICAE management application 126 determines that the specific media content 120 should not be authenticated via ICA. The method 400 then proceeds to operation 410 and the method 400 can end.

The method 400 can be a sub-method of the method 200 described above. In particular, the output of the method 400 (i.e., a determination that the specific media content should or should not be authenticated via ICA) can be used in the determination operation 208 described above in context of the method 200.

Figure 5:
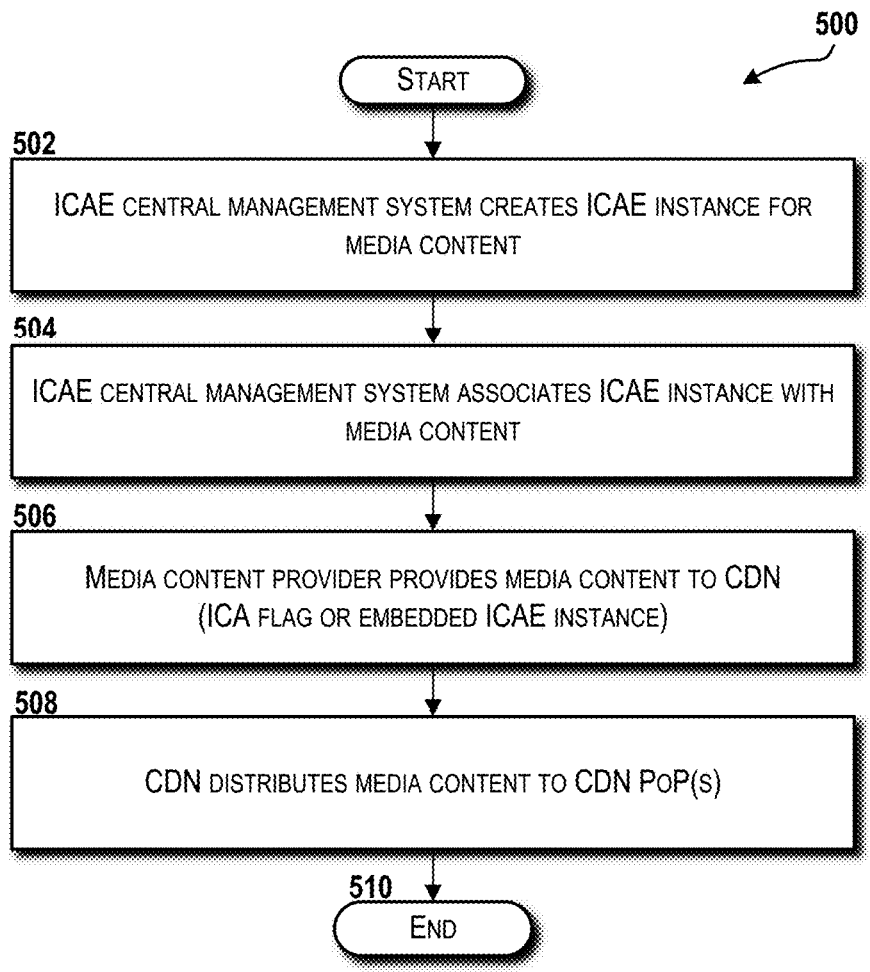
FIG. 5 is a flow diagram illustrating a method for creating an ICA engine ("ICAE") instance, according to an illustrative embodiment of the concepts and technologies disclosed herein.

Turning now to FIG. 5, a method 500 for creating an ICAE instance 106 will be described, according to an illustrative embodiment of the concepts and technologies disclosed herein. The method 500 can be performed at different times depending on the needs of a given implementation. The method 500 can be performed before the media content provider 114 provides the media content 120 to the CDN 112. Alternatively, the method 500 can be performed after the media content provider 114 has provided the media content 120 to the CDN 112.

The method 500 begins and proceeds to operation 502. At operation 502, the ICAE central management system 128 creates the ICAE instance 106 for the media content 120.

The ICAE central management system 128 can create a global version of the ICAE instance 106 for the media content 120. A global version of the ICAE instance 106 can be used to authenticate any copy of the media content 120 (such as embodied as one of the media files 108). The global version of the ICAE instance 106 can serve as a baseline of the ICAE instance 106. Over time, the global version of the ICAE instance 106 can be modified for a specific user, a specific account, and/or a specific media content playback device (e.g., the media content playback device 110). The ICAE central management system 128 may perform the modification or may instruct the CDN-side ICAE management application 126 to do so. Alternatively, the ICAE instance 106 can be created specifically for the media content 120 to be consumed by a specific user, a specific account, and/or specific media playback device (e.g., the media content playback device 110).

From operation 502, the method 500 proceeds to operation 504. At operation 504, the ICAE central management system 128 associates the ICAE instance 106 with the media content 120. A global version of the ICAE instance 106 can be associated with the media content 120 for use in all distribution and authentication of the media content 120, unless further authentication is needed based upon a specific user, a specific account, and/or a specific media playback device, in which case the ICAE instance 106 can be modified accordingly.

From operation 504, the method 500 proceeds to operation 506. At operation 506, the media content provider 114 provides the media content 120 to the CDN 112. In some embodiments, prior to providing the media content 120 to the CDN 112, the media content provider 114 enables an ICA flag for the media content 120. In this manner, the CDN 112 can be made aware that the media content 120 is to be authenticated via ICA. In some other embodiments, the media content provider 114 can embed the ICAE instance 106 in the media content 120. Alternatively, the ICAE instance 106 can be appended, attached, or otherwise associated with the media content 120.

From operation 506, the method 500 proceeds to operation 508. At operation 508, the CDN 112 distributes the media content 120 to one or more of the CDN PoP(s) 122. The CDN 112 can distribute the media content 120 to the CDN PoP(s) 122 along with the ICAE instance 106 or the ICA flag. Alternatively, the CDN 112 can distribute the media content 120 to the CDN PoP(s) 122 without the ICAE instance 106 or ICA flag, in which case the CDN PoP(s) 122 can communicate with the CDN 112 to obtain the ICAE instance 106 or ICA flag information. The CDN-side ICAE management application 126 may coordinate with the ICAE central management application 130 to obtain the ICAE instance 106 or the ICA flag information.

From operation 508, the method 500 proceeds to operation 510. At operation 510, the method 500 can end.

Figure 6:
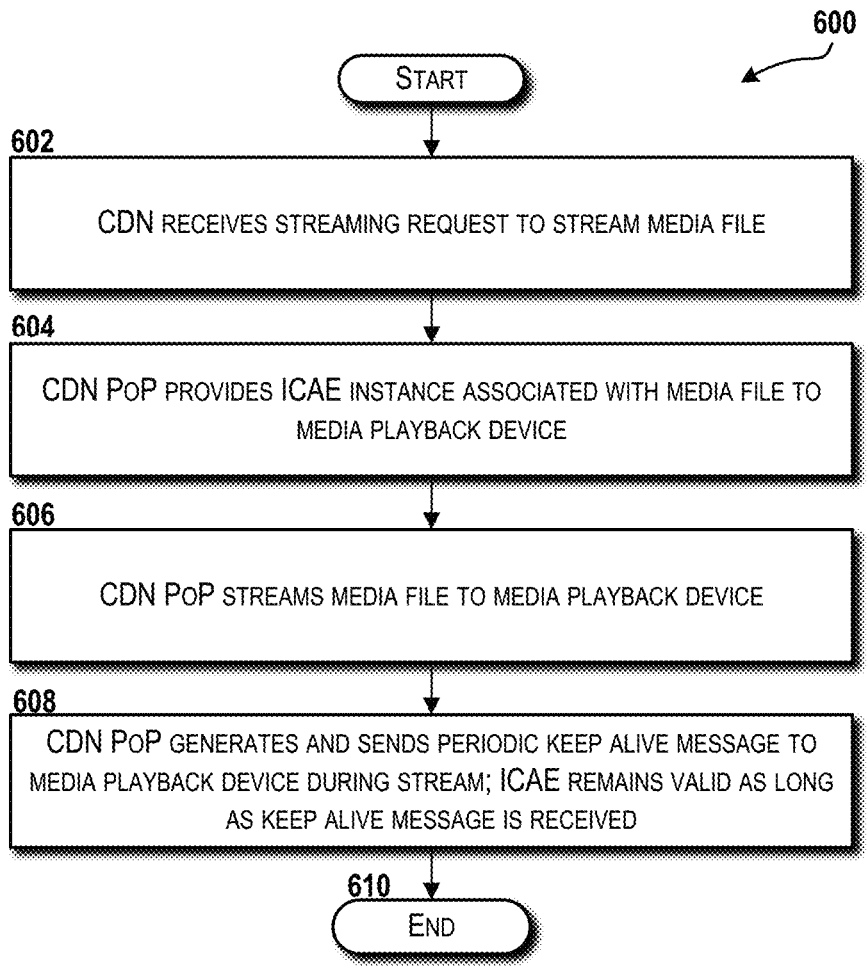
FIG. 6 is a flow diagram illustrating a method for implementing ICA-based authentication for streaming media content, according to an illustrative embodiment of the concepts and technologies disclosed herein.

Turning now to FIG. 6, a method 600 for implementing ICA-based authentication for streaming the media file 108 of the media content 120 will be described, according to an illustrative embodiment of the concepts and technologies disclosed herein. The method 600 begins and proceeds to operation 602. At operation 602, the CDN 112 receives, from the media content playback device 110, a streaming request to stream the media file 108. The media content playback device 110 can initiate the streaming request through a native application or website.

From operation 602, the method 600 proceeds to operation 604. At operation 604, the CDN PoP 122 provides the ICAE instance 106 associated with the media content to the media playback device. From operation 604, the method 600 proceeds to operation 606. At operation 606, the CDN PoP 122 streams the media file 108 to the media content playback device 110. From operation 606, the method 600 proceeds to operation 608. At operation 608, the CDN PoP 122 generates and sends a periodic keep alive message to the media content playback device 110 during the stream. The ICAE instance 106 remains valid as long as a keep alive message is received.

From operation 608, the method 600 proceeds to operation 610. At operation 610, the method 600 can end.

Figure 7:
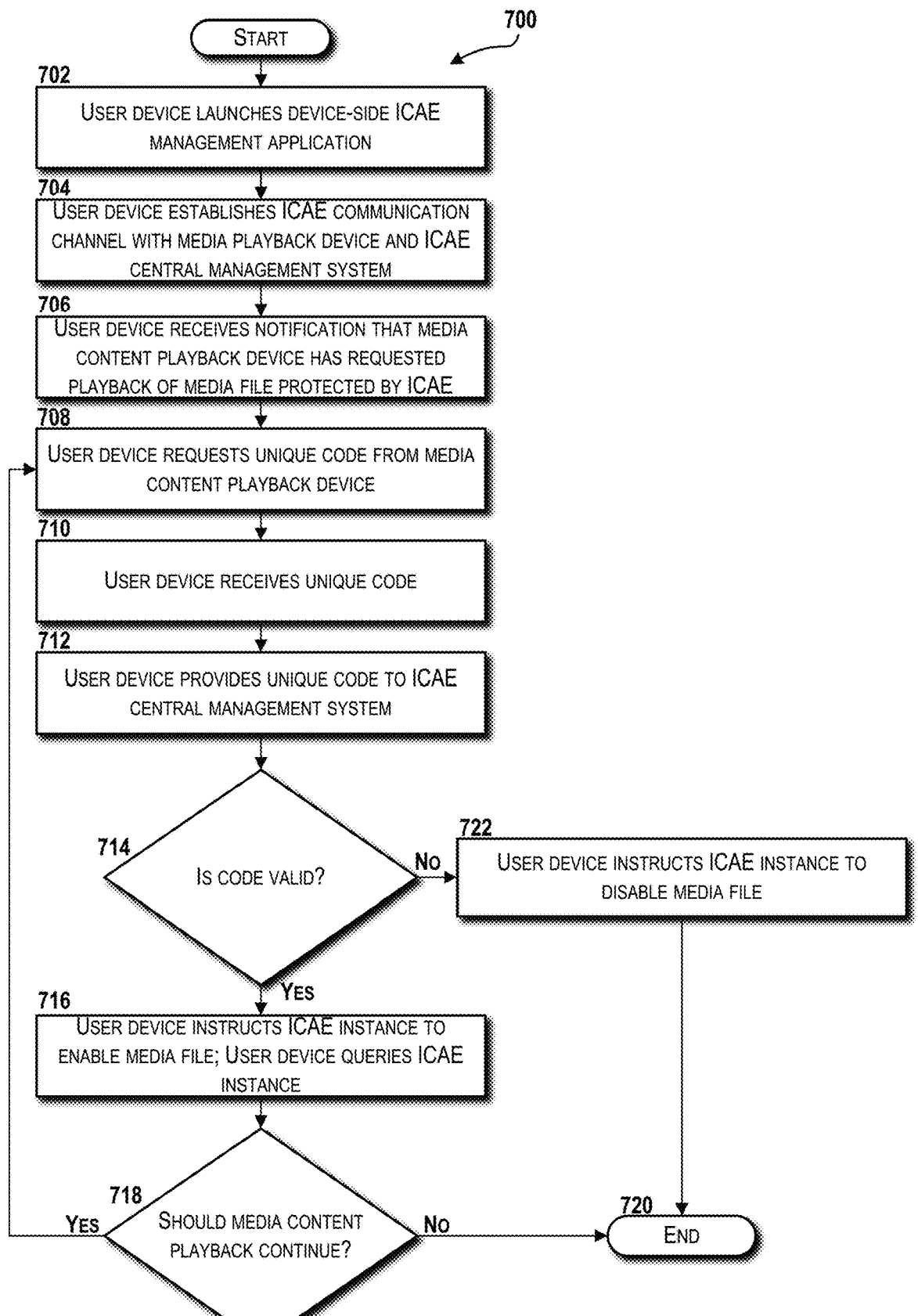
FIG. 7 is a flow diagram illustrating a method for implementing ICA from the perspective of a user device executing a device-side ICAE management application, according to an illustrative embodiment of the concepts and technologies disclosed herein.

Turning now to FIG. 7, a method 700 for implementing ICA from the perspective of the user device 102 executing the device-side ICAE management application 104 will be described, according to an illustrative embodiment of the concepts and technologies disclosed herein. The method 700 begins and proceeds to operation 702. At operation 702, the user device 102 launches the device-side ICAE management application 104. The user device 102 may launch the device-side ICAE management application 104 as part of a startup routine when the user device 102 is powered on. Alternatively, the user device 102 may launch the device-side ICAE management application 104 when a media playback application is launched on the media content playback device 110. The user device 102 may launch the device-side ICAE management application 104 at other times as needed.

From operation 702, the method 700 proceeds to operation 704. At operation 704, the user device 102 establishes the ICAE communication channel$_3$ 132C with the media content playback device 110 and the ICAE communication channel$_2$ 132B with the ICAE central management system 128. The ICAE communication channels 132 can be established using different technologies based upon the needs of a given implementation. BLUETOOTH and/or other short-range communication technologies can be used when the user device 102 and the media content playback device 110 are within communication range of such technologies. WI-FI can be used for local communications between the user device 102 and the media content playback device 110 that require additional range. Long-range communication via the PDN 116 is also contemplated, such as for communication between the user device 102 and the ICAE central management system 128 and/or between the user device 102 and the media content playback device 110 when the media content playback device 110 is out of range of short-range communication technologies or WI-FI.

From operation 704, the method 700 proceeds to operation 706. At operation 706, the user device 102 receives a notification that the media content playback device 110 has requested playback of the media file 108 protected by the ICAE instance 106. The notification may be received from the media content playback device 110, the CDN-side ICAE management application 126, or the ICAE central management application 130 depending on the configuration. The notification can be automatically generated when the media file 108 is requested or in response to a user requesting playback of the media file 108 via the media content playback device 110.

From operation 706, the method 700 proceeds to operation 708. At operation 708, the device-side ICAE management application 104 requests a unique code from the media content playback device 110. The unique code can be pre-generated by an external entity, such as the CDN 112 via the CDN-side ICAE management application 126, or the ICAE central management system 128 via the ICAE central management application 130. Alternatively, the ICAE instance 106 may coordinate with the CDN 112 and/or the ICAE central management system 128 to obtain the unique code after receiving a request from the device-side ICAE management application 104. The unique code can be static and assigned to the ICAE instance 106 associated with the media file 108 for which playback has been requested. The unique code can be a dynamic code that changes over time. The unique code can be changed periodically, changed based upon a schedule, or changed randomly/pseudo-randomly. The unique code can be associated with a single playback session or multiple playback sessions of the media file 108.

From operation 708, the method 700 proceeds to operation 710. At operation 710, the user device 102 receives the unique code from the media content playback device 110. From operation 710, the method 700 proceeds to operation 712. At operation 712, the user device 102 provides the unique code to the ICAE central management system 128, which determines whether or not the unique code is valid and reports back to the user device 102. From operation 712, the method 700 proceeds to operation 714. At operation 714, the user device 102 determines if the unique code is valid based upon the results provided by the ICAE central management system 128. If the unique code is valid, the method 700 proceeds to operation 716. At operation 716, the user device 102 instructs the ICAE instance 106 to enable the media file 108 so that playback on the media content playback device 110 can occur. The media content playback device 110 can then playback the media file 108. If playback is stopped, the ICAE instance 106 can inform the user device 102. The user device 102 also can query the ICAE instance 106 for playback status. This query can be made periodically (e.g., every X minutes) or based on some other schedule to determine whether playback of the media file 108 should continue.

From operation 716, the method 700 proceeds to operation 718. At operation 718, the user device 102 can determine if playback of the media file 108 should continue. If media playback has stopped or the user device 102 determines that playback of the media file 108 should not continue (e.g., due to suspected misuse), the method 700 proceeds to operation 720 and the method 700 can end. If the user device 102 determines that playback of the media file 108 should continue, the method 700 returns to operation 708. At operation 708, the user device 102 requests the unique code from the media content playback device 110 and the method 700 continues as described above.

Returning to operation 714, if the user device 102 determines that the unique code is invalid, the method 700 proceeds to operation 722. At operation 722, the user device 102 instructs the ICAE instance 106 to disable the media file 108. The ICAE instance 106 can automatically delete the media file 108 if the media file 108 is stored locally on the media content playback device 110 or interrupt a streaming session if the media file 108 is being streamed. The ICAE instance 106 can disable the media file 108 in other ways. For example, the ICAE instance 106 may corrupt the media file 108 rendering it unplayable, or if playable, unrecognizable as the original media file 108. From operation 722, the method 700 proceeds to operation 720 and the method 700 can end.

Figure 8:
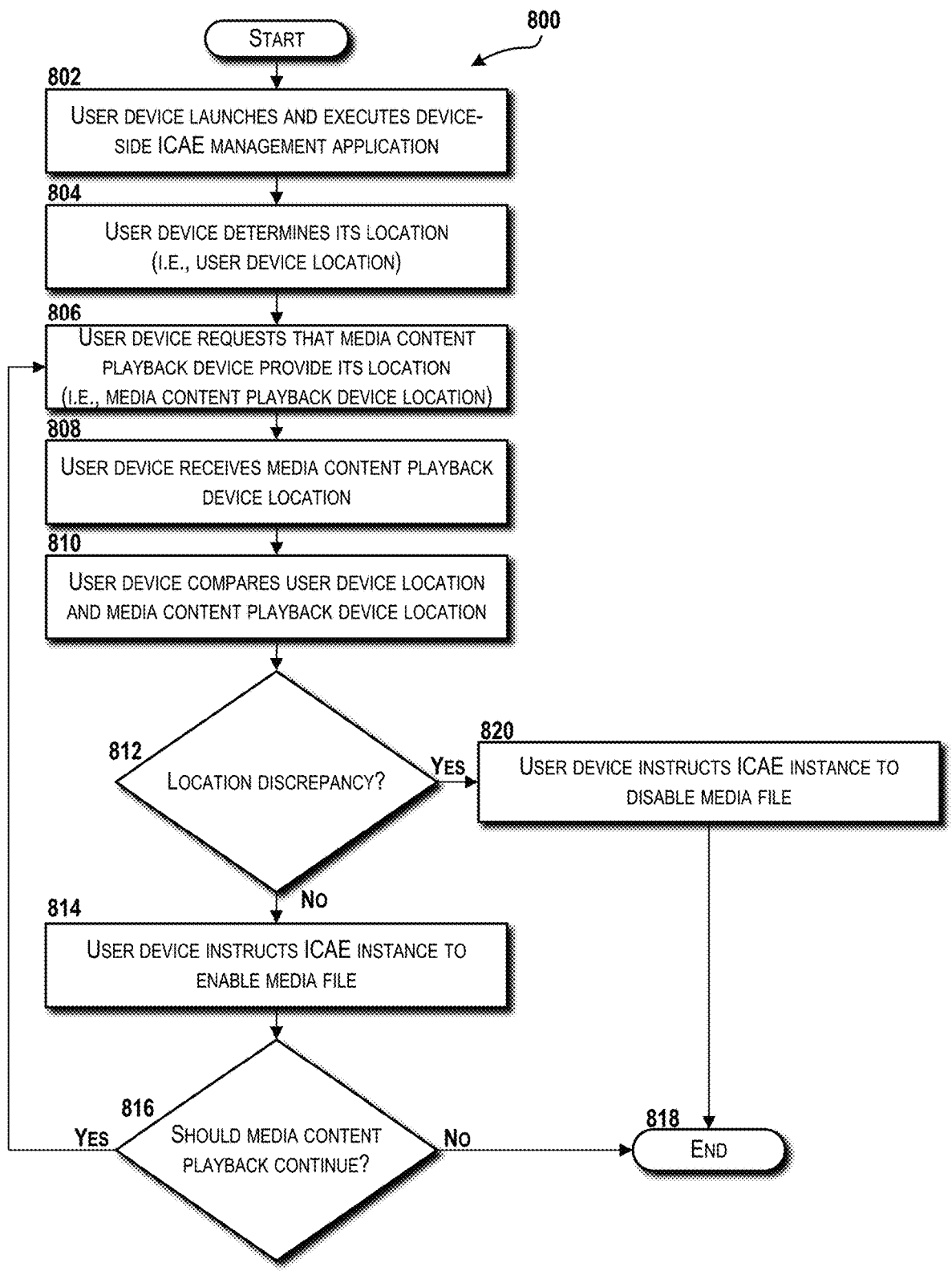
FIG. 8 is a flow diagram illustrating a method for implementing location-based ICA from the perspective of a user device executing a device-side ICAE management application, according to an illustrative embodiment of the concepts and technologies disclosed herein.

Turning now to FIG. 8, a method 800 for implementing location-based ICA from the perspective of the user device 102 executing the device-side ICAE management application 104 will be described, according to an illustrative embodiment of the concepts and technologies disclosed herein. The method 800 begins and proceeds to operation 802. At operation 802, the user device 102 launches and executes the device-side ICAE management application 104.

From operation 802, the method 800 proceeds to operation 804. At operation 804, the user device 102 determines its location (referred to hereinafter as "user device location"). The user device 102 can utilize any location determining technique, some examples of which include, but are not limited to, GPS and cellular triangulation. From operation 804, the method 800 proceeds to operation 806. At operation 806, the user device 102 requests that the media content playback device 110 provide its location (referred to hereinafter as "media content playback device location"). The media content playback device also can use any location determining technique, although some implementations (e.g., the media content playback device 110 embodied as a smart television) may be better suited to using an ISP-provided location (e.g., based on IP address). In some embodiments, the media content playback device location can be derived from its proximity to the user device 102. The proximity can be measured based on signal strength of a local WI-FI connection, BLUETOOTH or some other short-range communication technology, NFC, combinations thereof, and/or the like.

From operation 806, the method 800 proceeds to operation 808. At operation 808, the user device 102 receives the media content playback device location. From operation 808, the method 800 proceeds to operation 810. At operation 810, the user device 102 compares the user device location and the media content playback device location. From operation 810, the method 800 proceeds to operation 812. At operation 812, the user device 102 determines if a location discrepancy exists between the user device location and the media content playback device location. What is considered to be a location discrepancy can be determined based upon one or more rules. For example, the media content provider 114 can define a location rule that specifies where the media content playback device 110 can be in relation to the user device 102 and still be authenticated to playback of the media file(s) 108. The location rule may specify a geographic area, such as a state, county, zip code, or city, within which both the user device 102 and the media content playback device 110 must be located to enable the media file(s) 108 to be played. The location rule alternatively may specify a distance between the user device 102 and the media content playback device 110. The distance may be calculated based on physical distance in terms of inches, feet, yards, miles, or some other unit of measurement. The distance also may be calculated based on communication distance based on the capabilities of the communication technologies used by the user device 102 and the media content playback device 110 to establish and maintain the ICAE communication channel$_3$ 132C. Signal strength and/or other communication metrics may be used to define the location rule(s).

If, at operation 812, the user device 102 determines that a location discrepancy does not exist, the method 800 proceeds to operation 814. At operation 814, the user device 102 instructs the ICAE instance 106 to enable the media file 108 for playback. From operation 814, the method 800 proceeds to operation 816. At operation 816, the user device 102 can determine if playback of the media file 108 should continue. If media playback has stopped or the user device determines that playback of the media content should not continue (e.g., due to suspected misuse), the method 800 proceeds to operation 818 and the method 800 can end. If the user device 102 determines that playback of the media file 108 should continue, the method 800 returns to operation 806. At operation 806, the user device 102 requests that the media content playback device 110 provide its latest location and the method 800 continues as described above.

Returning to operation 812, if the user device 102 determines that a location discrepancy exists, the method 800 proceeds to operation 820. At operation 820, the user device 102 instructs the ICAE instance 106 to disable the media file 108. The ICAE instance 106 can automatically delete the media file 108 if the media file 108 is stored locally on the media content playback device 110 or interrupt a streaming session if the media file 108 is being streamed. The ICAE instance 106 can disable the media file 108 in other ways. For example, the ICAE instance 106 may corrupt the media file 108 rendering it unplayable, or if playable, unrecognizable as the original media file 108. From operation 820, the method 800 proceeds to operation 818 and the method 800 can end.

Figure 9:
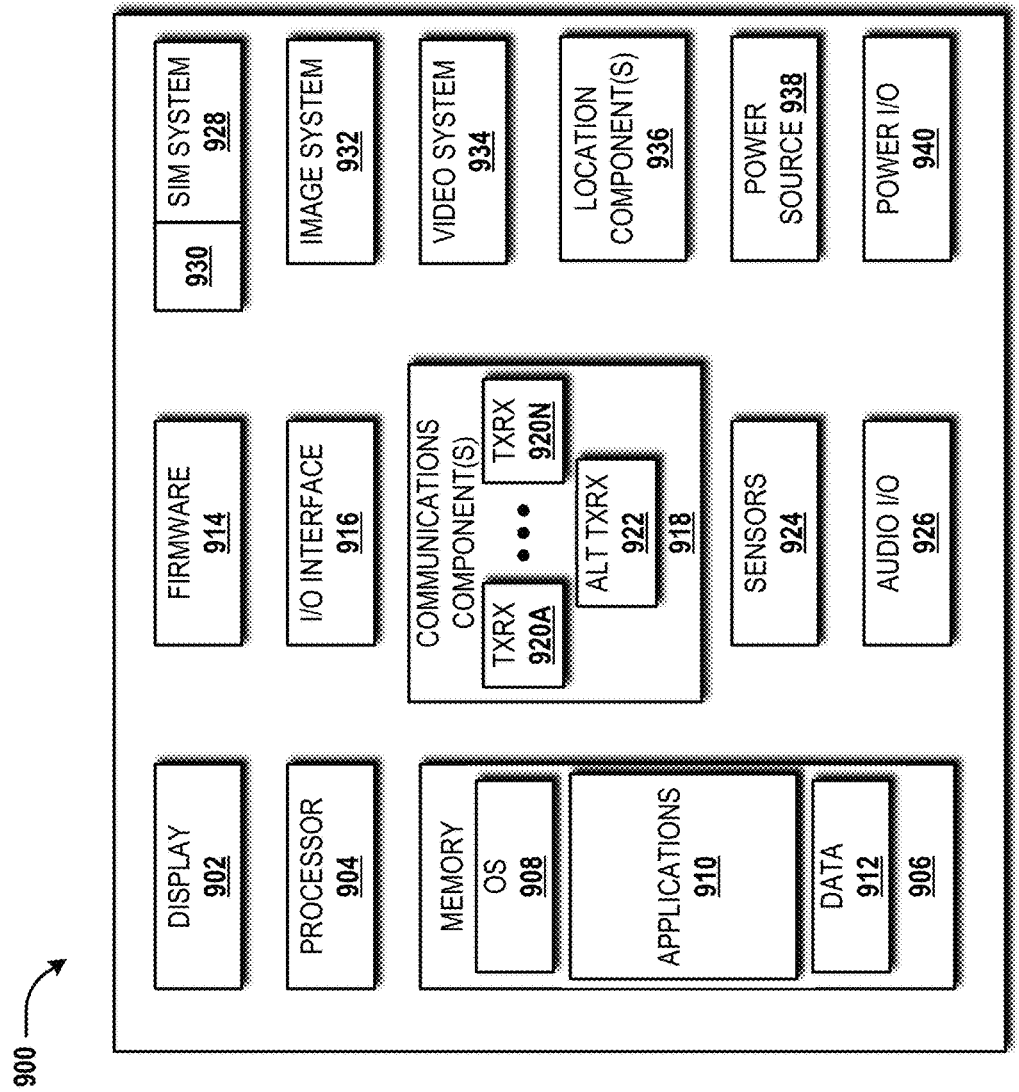
FIG. 9 is a block diagram illustrating an illustrative mobile device and components thereof capable of implementing aspects of the concepts and technologies disclosed herein.

Turning now to FIG. 9, an illustrative mobile device 900 and components thereof will be described. In some embodiments, the user device 102 and/or the media content playback device 110 is/are configured similar to or the same as the mobile device 900. While connections are not shown between the various components illustrated in FIG. 9, it should be understood that some, none, or all of the components illustrated in FIG. 9 can be configured to interact with one another to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910 (e.g., the device-side ICAE management application 104, one or more media content playback applications, and/or a web browser), other computer-executable instructions stored in the memory 906, or the like. In some embodiments, the applications 910 also can include a UI application (not illustrated in FIG. 9).

The UI application can interface with the operating system 908 to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in entering/deleting data, entering and setting user IDs and passwords for device access, configuring settings, manipulating content and/or settings, multimode interaction, interacting with other applications 910, and otherwise facilitating user interaction with the operating system 908, the applications 910, and/or other types or instances of data 912 that can be stored at the mobile device 900.

The applications 910, the data 912, and/or portions thereof can be stored in the memory 906 and/or in a firmware 914, and can be executed by the processor 904. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, presence status information, user IDs, passwords, and application initiation (start-up) requests. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks, such as the PDN 116 (e.g., the Internet), the CDN 112, one or more access networks (e.g., cellular and/or Wi-Fi). In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments, one or more of the transceivers of the communications component 918 may be configured to communicate Global System for Mobile communications ("GSM"), Code-Division Multiple Access ("CDMA"), CDMAONE, CDMA2000, Universal Mobile Telecommunications System ("UMTS"), Long-Term Evolution ("LTE"), and various other 2G, 2.5G, 3G, 4G, 4.5G, 5G, and greater generation technology standards. Moreover, the communications component 918 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 918 may facilitate data communications using General Packet Radio Service ("GPRS"), Enhanced Data rates for Global Evolution ("EDGE"), the High-Speed Packet Access ("HSPA") protocol family HSDPA, Enhanced Up Link ("EUL") (also referred to as HSUPA, HSPA+, and various other current and future wireless data access standards. In the illustrated embodiment, the communications component 918 can include a first transceiver ("TxRx") 920A that can operate in a first communications mode (e.g., GSM). The communications component 918 also can include an Nth transceiver ("TxRx") 920N that can operate in a second communications mode relative to the first transceiver 920A (e.g., UMTS). While two transceivers 920A-920N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), NFC, other RF technologies, combinations thereof, and the like. In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from GPS devices, assisted-GPS ("A-GPS") devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 900 or other devices or computers described herein, such as the computer system 1000 described below with reference to FIG. 10. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 900 in order to store and execute the software components presented herein. It is also contemplated that the mobile device 900 may not include all of the components shown in FIG. 9, may include other components that are not explicitly shown in FIG. 9, or may utilize an architecture completely different than that shown in FIG. 9.

Figure 10:
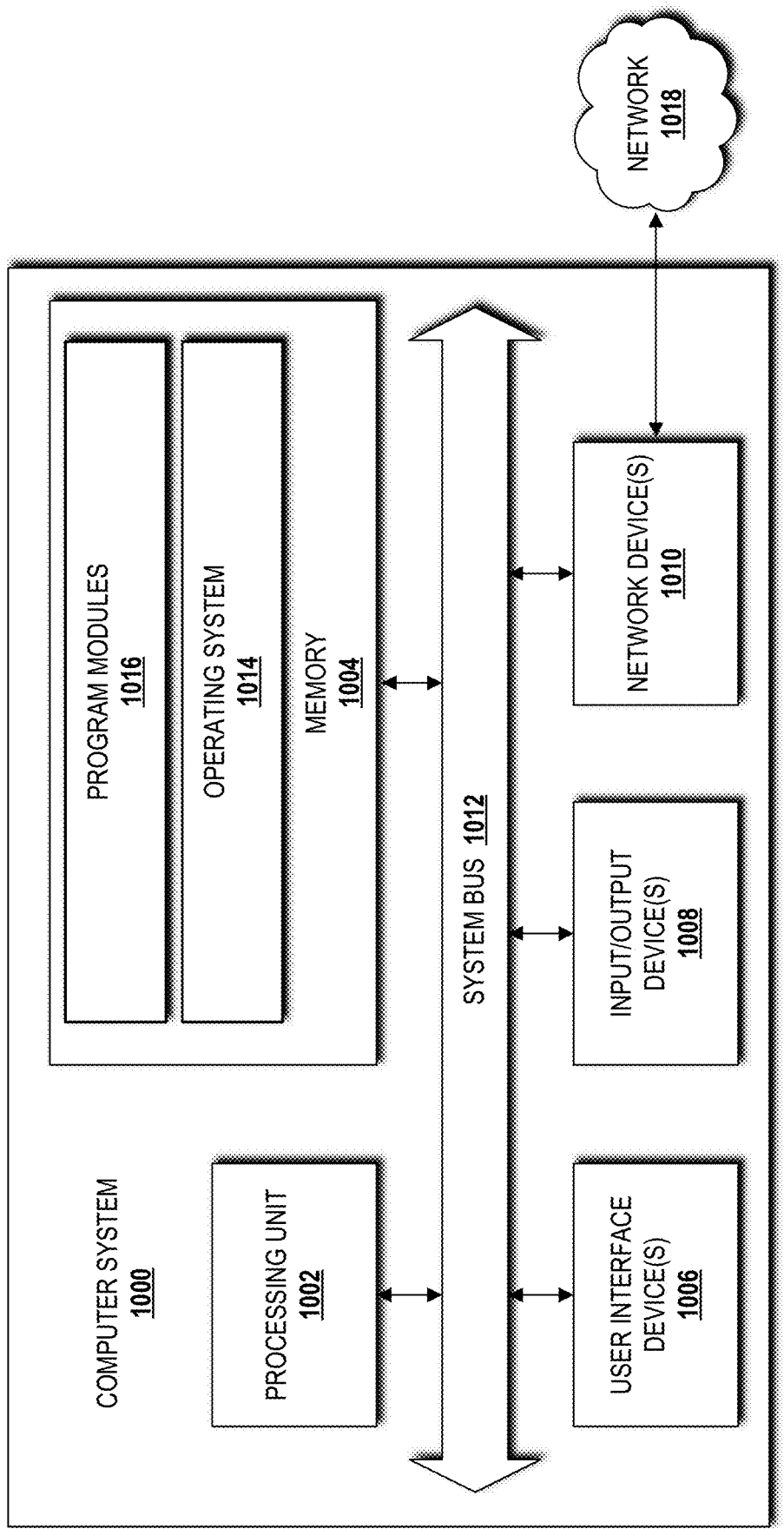
FIG. 10 is a diagram illustrating an illustrative computer system capable of implementing aspects of the concepts and technologies disclosed herein.

Turning now to FIG. 10, a block diagram illustrating a computer system 1000 configured to provide the functionality described herein in accordance with various embodiments of the concepts and technologies disclosed herein will be described. In some embodiments, the user device 102, the media content playback device 110, the CDN server(s) 118, the cache server(s) 124, and/or the ICAE central management system 128 is/are configured similar to or the same as the computer system 1000 described herein with respect to FIG. 10. It should be understood, however, that any of these systems, devices, server, or other elements may or may not include the functionality described herein with reference to FIG. 10.

The computer system 1000 includes a processing unit 1002, a memory 1004, one or more user interface devices 1006, one or more input/output ("I/O") devices 1008, and one or more network devices 1010, each of which is operatively connected to a system bus 1012. The bus 1012 enables bi-directional communication between the processing unit 1002, the memory 1004, the user interface devices 1006, the I/O devices 1008, and the network devices 1010.

The processing unit 1002 may be a standard central processor that performs arithmetic and logical operations, a more specific purpose programmable logic controller ("PLC"), a programmable gate array, or other type of processor known to those skilled in the art and suitable for controlling the operation of the computer system 1000.

The memory 1004 communicates with the processing unit 1002 via the system bus 1012. In some embodiments, the memory 1004 is operatively connected to a memory controller (not shown) that enables communication with the processing unit 1002 via the system bus 1012. The memory 1004 includes an operating system 1014 and one or more program modules 1016. The operating system 1014 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 1016 can include various software, program modules, and/or databases described herein. For example, the program modules 1016 can include the device-side ICAE management application 104, the CDN-side ICAE management application 126, the ICAE central management application 130, other applications that can be executed by the user device 102, the media content playback device 110, the ICAE central management system 128, the CDN server(s) 118, and/or the cache server(s) 124. The memory 1004 also can store the media content 120, the media files 108, the ICAE instances 106, and/or other data disclosed herein.

By way of example, and not limitation, computer-readable media may include any available computer storage media or communication media that can be accessed by the computer system 1000. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1000. In the claims, the phrase "computer storage medium," "computer-readable storage medium," and variations thereof does not include waves or signals per se and/or communication media, and therefore should be construed as being directed to "non-transitory" media only.

The user interface devices 1006 may include one or more devices with which a user accesses the computer system 1000. The user interface devices 1006 may include, but are not limited to, computers, servers, personal digital assistants, cellular phones, or any suitable computing devices. The I/O devices 1008 enable a user to interface with the program modules 1016. In one embodiment, the I/O devices 1008 are operatively connected to an I/O controller (not shown) that enables communication with the processing unit 1002 via the system bus 1012. The I/O devices 1008 may include one or more input devices, such as, but not limited to, a keyboard, a mouse, or an electronic stylus. Further, the I/O devices 1008 may include one or more output devices, such as, but not limited to, a display screen or a printer to output data.

The network devices 1010 enable the computer system 1000 to communicate with other networks or remote systems via one or more networks, such as PDN 116. Examples of the network devices 1010 include, but are not limited to, a modem, a RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a Wireless Metropolitan Area Network ("WMAN") such as a Worldwide Interoperability for Microwave Access ("WiMAX") network, or a cellular network. Alternatively, the network(s) may be a wired network such as, but not limited to, a WAN such as the Internet, a LAN, a wired PAN, or a wired MAN.

Figure 11:
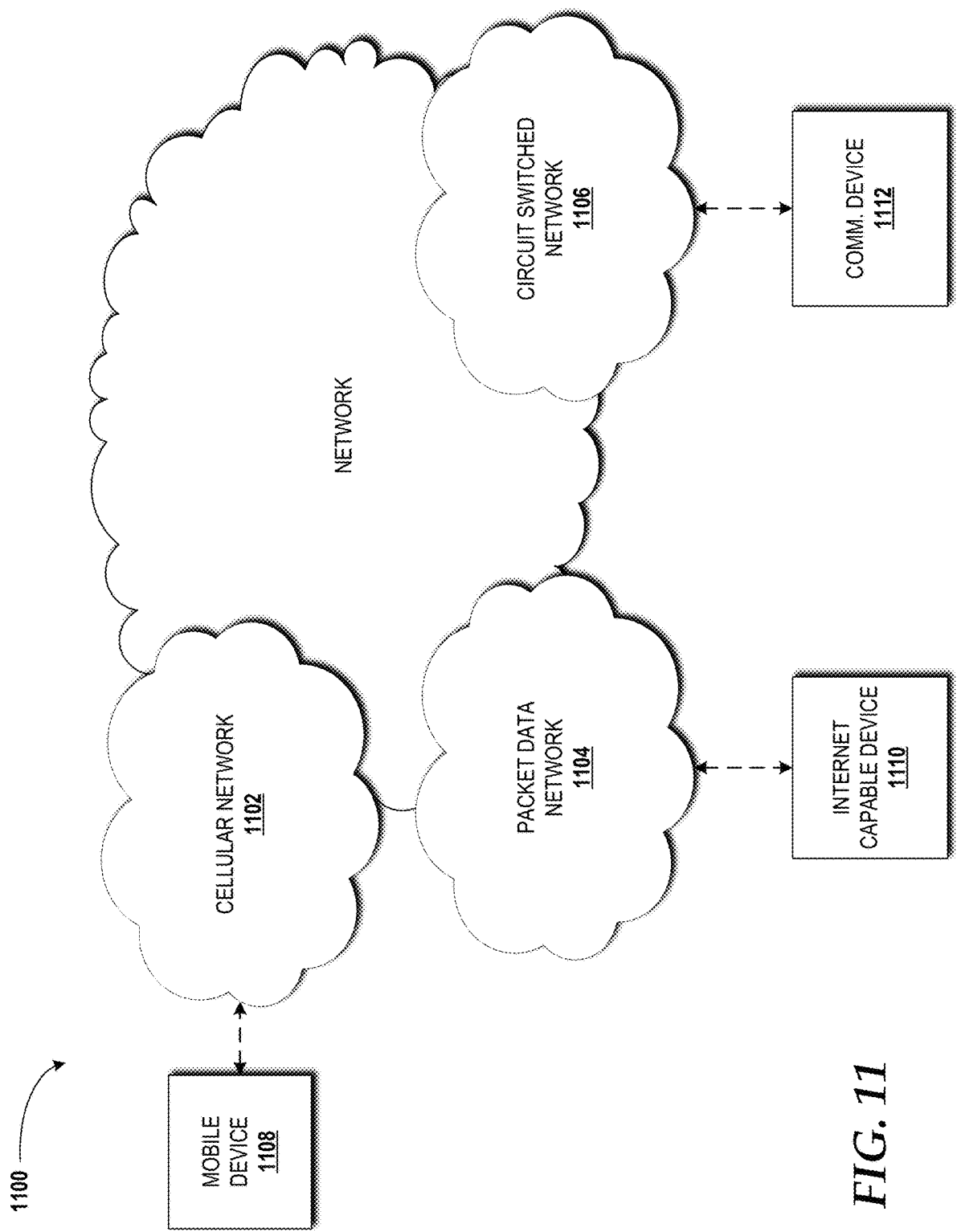
FIG. 11 is a diagram illustrating an illustrative network capable of implementing aspects of the concepts and technologies disclosed herein.

Turning now to FIG. 11, additional details of an embodiment of a network 1100 will be described, according to an illustrative embodiment. In the illustrated embodiment, the network 1100 includes a cellular network 1102, a packet data network 1104, for example, the Internet, and a circuit switched network 1106, for example, a publicly switched telephone network ("PSTN"). The cellular network 1102 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), HSSs, visitor location registers ("VLRs"), charging platforms, billing platforms, voicemail platforms, GPRS core network components, location service nodes, an IP Multimedia Subsystem ("IMS"), and the like. The cellular network 1102 also includes radios and nodes for receiving and transmitting voice, data, and combinations thereof to and from radio transceivers, networks, the packet data network 11010, and the circuit switched network 1106.

A mobile communications device 1108, such as, for example, the user device 102, the media content playback device 110, a cellular telephone, a user equipment, a mobile terminal, a PDA, a laptop computer, a handheld computer, and combinations thereof, can be operatively connected to the cellular network 1102. The cellular network 1102 can be configured to utilize any using any wireless communications technology or combination of wireless communications technologies, some examples of which include, but are not limited to, GSM, CDMA ONE, CDMA2000, UMTS, LTE, WiMAX, other Institute of Electrical and Electronics Engineers ("IEEE") 802.XX technologies, and the like. The mobile communications device 1108 can communicate with the cellular network 1102 via various channel access methods (which may or may not be used by the aforementioned technologies), including, but not limited to, TDMA, FDMA, CDMA, W-CDMA, OFDM, Single-Carrier FDMA ("SC-FDMA"), SDMA, and the like. Data can be exchanged between the mobile communications device 1108 and the cellular network 1102 via cellular data technologies such as, but not limited to, GPRS, EDGE, the HSPA protocol family including GPRS, EDGE, the HSPA protocol family including HSDPA, EUL or otherwise termed HSUPA, Evolved HSPA ("HSPA+"), LTE, 5G technologies, and/or various other current and future wireless data access technologies. It should be understood that the cellular network 1102 may additionally include backbone infrastructure that operates on wired communications technologies, including, but not limited to, optical fiber, coaxial cable, twisted pair cable, and the like to transfer data between various systems operating on or in communication with the cellular network 1102.

The packet data network 1104 can be configured the same as or similar to the PDN 116. The packet data network 1104 can include various systems/platforms/devices, such as, for example, the CDN 112, the CDN server(s) 118, the cache server(s) 124, other servers, computers, databases, and other systems/platforms/devices, in communication with one another. The packet data network 1104 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1104 includes or is in communication with the Internet.

The circuit switched network 1106 includes various hardware and software for providing circuit switched communications. The circuit switched network 1106 may include, or may be, what is often referred to as a plain old telephone system ("POTS"). The functionality of a circuit switched network 1106 or other circuit-switched network are generally known and will not be described herein in detail.

The illustrated cellular network 1102 is shown in communication with the packet data network 1104 and a circuit switched network 1106, though it should be appreciated that this is not necessarily the case. One or more Internet-capable systems/devices 1110, for example, the media content playback device 110, the user device 102, a personal computer ("PC"), a laptop, a portable device, or another suitable device, can communicate with one or more cellular networks 1102, and devices connected thereto, through the packet data network 1104. It also should be appreciated that the Internet-capable device 1110 can communicate with the packet data network 1104 through the circuit switched network 1106, the cellular network 1102, and/or via other networks (not illustrated).

As illustrated, a communications device 1112, for example, a telephone, facsimile machine, modem, computer, or the like, can be in communication with the circuit switched network 1106, and therethrough to the packet data network 1104 and/or the cellular network 1102. It should be appreciated that the communications device 1112 can be an Internet-capable device, and can be substantially similar to the Internet-capable device 1110. It should be appreciated that substantially all of the functionality described with reference to the network 1100 can be performed by the cellular network 1102, the packet data network 1104, and/or the circuit switched network 1106, alone or in combination with additional and/or alternative networks, network elements, and the like.

Figure 12:
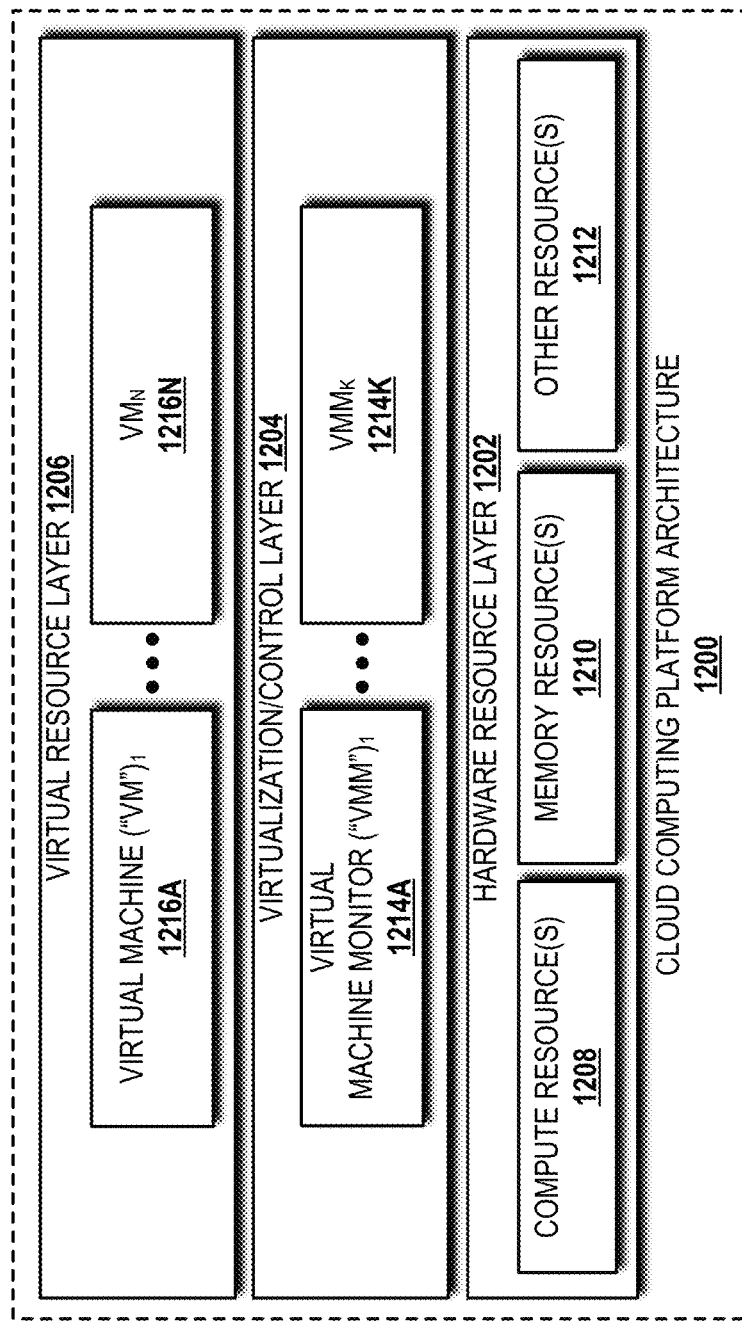
FIG. 12 is a diagram illustrating an illustrative cloud computing platform architecture capable of implementing aspects of the concepts and technologies disclosed herein.

Turning now to FIG. 12, a cloud computing platform architecture 1200 capable of implementing aspects of the concepts and technologies disclosed herein will be described, according to an illustrative embodiment. In some embodiments, the CDN 112, the CDN server(s) 118, the CDN PoP(s) 122, the cache server(s) 124, the ICAE central management system 128, one or more components thereof, can be implemented, at least in part, on the cloud computing platform architecture 1200. Those skilled in the art will appreciate that the illustrated cloud computing platform architecture 1200 is a simplification of but one possible implementation of an illustrative cloud computing platform, and as such, the cloud computing platform architecture 1200 should not be construed as limiting in any way.

The illustrated cloud computing platform architecture 1200 includes a hardware resource layer 1202, a virtualization/control layer 1204, and a virtual resource layer 1206 that work together to perform operations as will be described in detail herein. While connections are shown between some of the components illustrated in FIG. 12, it should be understood that some, none, or all of the components illustrated in FIG. 12 can be configured to interact with one other to carry out various functions described herein. In some embodiments, the components are arranged so as to communicate via one or more networks (not shown). Thus, it should be understood that FIG. 12 and the following description are intended to provide a general understanding of a suitable environment in which various aspects of embodiments can be implemented, and should not be construed as being limiting in any way.

The hardware resource layer 1202 provides hardware resources, which, in the illustrated embodiment, include one or more compute resources 1208, one or more memory resources 1210, and one or more other resources 1212. The compute resource(s) 1206 can include one or more hardware components that perform computations to process data, and/or to execute computer-executable instructions of one or more application programs, operating systems, and/or other software. The compute resources 1208 can include one or more central processing units ("CPUs") configured with one or more processing cores. The compute resources 1208 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 1208 can include one or more discrete GPUs. In some other embodiments, the compute resources 1208 can include CPU and GPU components that are configured in accordance with a co-processing CPU/GPU computing model, wherein the sequential part of an application executes on the CPU and the computationally-intensive part is accelerated by the GPU. The compute resources 1208 can include one or more system-on-chip ("SoC") components along with one or more other components, including, for example, one or more of the memory resources 1210, and/or one or more of the other resources 1212. In some embodiments, the compute resources 1208 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 1208 can be or can include one or more hardware components architected in accordance with an ARM architecture, available for license from ARM HOLDINGS of Cambridge, United Kingdom. Alternatively, the compute resources 1208 can be or can include one or more hardware components architected in accordance with an x86 architecture, such an architecture available from INTEL CORPORATION of Mountain View, Calif., and others. Those skilled in the art will appreciate the implementation of the compute resources 1208 can utilize various computation architectures, and as such, the compute resources 1208 should not be construed as being limited to any particular computation architecture or combination of computation architectures, including those explicitly disclosed herein.

The memory resource(s) 1210 can include one or more hardware components that perform storage operations, including temporary or permanent storage operations. In some embodiments, the memory resource(s) 1210 include volatile and/or non-volatile memory implemented in any method or technology for storage of information such as computer-readable instructions, data structures, program modules, or other data disclosed herein. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 1208.

The other resource(s) 1212 can include any other hardware resources that can be utilized by the compute resources(s) 1206 and/or the memory resource(s) 1210 to perform operations. The other resource(s) 1212 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 1202 can be virtualized by one or more virtual machine monitors ("VMMs") 1214A-1214K (also known as "hypervisors;" hereinafter "VMMs 1214") operating within the virtualization/control layer 1204 to manage one or more virtual resources that reside in the virtual resource layer 1206. The VMMs 1214 can be or can include software, firmware, and/or hardware that alone or in combination with other software, firmware, and/or hardware, manages one or more virtual resources operating within the virtual resource layer 1206.

The virtual resources operating within the virtual resource layer 1206 can include abstractions of at least a portion of the compute resources 1208, the memory resources 1210, the other resources 1212, or any combination thereof. These abstractions are referred to herein as virtual machines ("VMs"). In the illustrated embodiment, the virtual resource layer 1206 includes VMs 1216A-1216N (hereinafter "VMs 1216").

Figure 13:
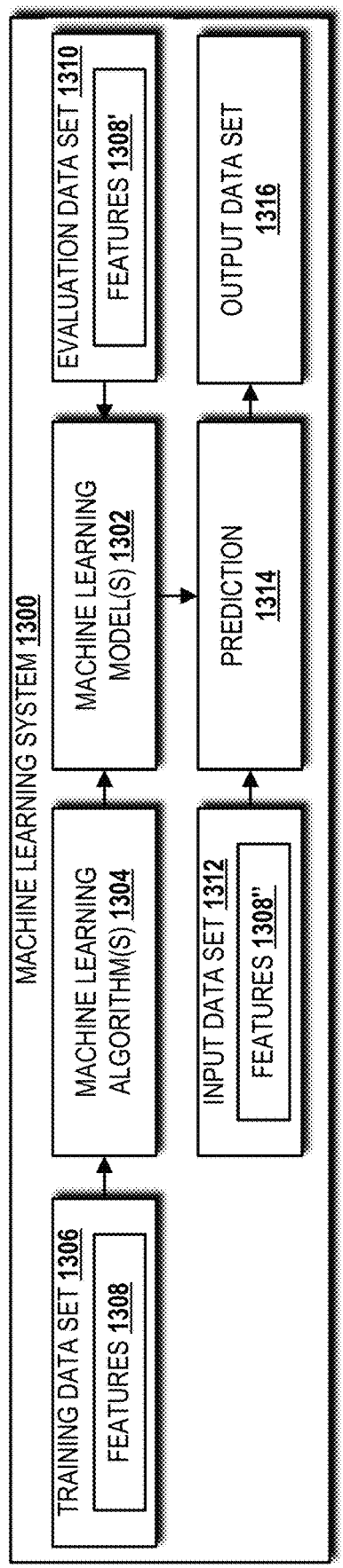
FIG. 13 is a diagram illustrating an illustrative machine learning system capable of implementing aspects of the concept and technologies disclosed herein.

Turning now to FIG. 13, a machine learning system 1300 capable of implementing aspects of the embodiments disclosed herein will be described. In some embodiments, the user device 102, the media content playback device 110, the ICAE central management system 128, the CDN server(s) 118, the cache server(s) 124, or some combination thereof can be configured to utilize the machine learning system 1300. The illustrated machine learning system 1300 includes one or more machine learning models 1302. The machine learning models 1302 can include supervised and/or semi-supervised learning models. The machine learning model(s) 1302 can be created by the machine learning system 1300 based upon one or more machine learning algorithms 1304. The machine learning algorithm(s) 1304 can be any existing, well-known algorithm, any proprietary algorithms, or any future machine learning algorithm. Some example machine learning algorithms 1304 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 1304 based upon the problem(s) to be solved by machine learning via the machine learning system 1300.

The machine learning system 1300 can control the creation of the machine learning models 1302 via one or more training parameters. In some embodiments, the training parameters are selected modelers at the direction of an enterprise, for example. Alternatively, in some embodiments, the training parameters are automatically selected based upon data provided in one or more training data sets 1306. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 1304 converges to the optimal weights. The machine learning algorithm 1304 can update the weights for every data example included in the training data set 1306. The size of an update is controlled by the learning rate. A learning rate that is too high might prevent the machine learning algorithm 1304 from converging to the optimal weights. A learning rate that is too low might result in the machine learning algorithm 1304 requiring multiple training passes to converge to the optimal weights.

The model size is regulated by the number of input features ("features") 1308 in the training data set 1306. A greater the number of features 1308 yields a greater number of possible patterns that can be determined from the training data set 1306. The model size should be selected to balance the resources (e.g., compute, memory, storage, etc.) needed for training and the predictive power of the resultant machine learning model 1302.

The number of training passes indicates the number of training passes that the machine learning algorithm 1304 makes over the training data set 1306 during the training process. The number of training passes can be adjusted based, for example, on the size of the training data set 1306, with larger training data sets being exposed to fewer training passes in consideration of time and/or resource utilization. The effectiveness of the resultant machine learning model 1302 can be increased by multiple training passes.

Data shuffling is a training parameter designed to prevent the machine learning algorithm 1304 from reaching false optimal weights due to the order in which data contained in the training data set 1306 is processed. For example, data provided in rows and columns might be analyzed first row, second row, third row, etc., and thus an optimal weight might be obtained well before a full range of data has been considered. By data shuffling, the data contained in the training data set 1306 can be analyzed more thoroughly and mitigate bias in the resultant machine learning model 1302.

Regularization is a training parameter that helps to prevent the machine learning model 1302 from memorizing training data from the training data set 1306. In other words, the machine learning model 1302 fits the training data set 1306, but the predictive performance of the machine learning model 1302 is not acceptable. Regularization helps the machine learning system 1300 avoid this overfitting/memorization problem by adjusting extreme weight values of the features 1308. For example, a feature that has a small weight value relative to the weight values of the other features in the training data set 1306 can be adjusted to zero.

The machine learning system 1300 can determine model accuracy after training by using one or more evaluation data sets 1310 containing the same features 1308' as the features 1308 in the training data set 1306. This also prevents the machine learning model 1302 from simply memorizing the data contained in the training data set 1306. The number of evaluation passes made by the machine learning system 1300 can be regulated by a target model accuracy that, when reached, ends the evaluation process and the machine learning model 1302 is considered ready for deployment.

After deployment, the machine learning model 1302 can perform a prediction operation ("prediction") 1314 with an input data set 1312 having the same features 1308" as the features 1308 in the training data set 1306 and the features 1308' of the evaluation data set 1310. The results of the prediction 1314 are included in an output data set 1316 consisting of predicted data. The machine learning model 1302 can perform other operations, such as regression, classification, and others. As such, the example illustrated in FIG. 13 should not be construed as being limiting in any way.

Based on the foregoing, it should be appreciated that concepts and technologies directed to intelligent continuous authentication for digital rights management have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   receiving, by a user device comprising a processor executing a device-side intelligent continuous authentication engine ("ICAE") management application, a notification that a media content playback device has requested playback of a media file that is protected by an ICAE instance;
   requesting, by the user device, a unique code from the media content playback device, wherein the unique code is associated with the ICAE instance and the media file;
   providing, by the user device, the unique code to an ICAE central management system associated with a media content provider that provides media content encompassed in the media file;
   determining, by the user device, based upon a result provided by the ICAE central management system, whether the unique code is valid or invalid; and
   instructing, by the user device, the ICAE instance to enable or disable the media file based upon whether the unique code is valid or invalid.

2. The method of claim 1, wherein receiving, by the user device, the notification comprises:
   receiving, by the user device, the notification from the media content playback device;
   receiving, by the user device, the notification from a content delivery network that is configured to deliver the media file to the media content playback device; or
   receiving, by the user device, the notification from an intelligent continuous authentication engine central management system associated with the media content provider that provides the media file.

3. The method of claim 1, wherein the unique code is pre-generated by an external entity.

4. The method of claim 3, wherein the external entity comprises:
   a content delivery network comprising a server executing a content delivery network-side ICAE management application; or
   the ICAE central management system executing an ICAE central management application.

5. The method of claim 1, wherein the unique code comprises a static code or a dynamic code associated with the media file.

6. The method of claim 5, wherein the unique code is viable for a single playback session of the media file or multiple playback sessions of the media file.

7. The method of claim 1, wherein instructing, by the user device, the ICAE instance to disable the media file based upon the unique code being invalid comprises instructing, by the user device, the ICAE instance to delete the media file.

8. The method of claim 1, wherein instructing, by the user device, the ICAE instance to disable the media file based upon the unique code being invalid comprises instructing, by the user device, the ICAE instance to interrupt the media content playback device from streaming the media file.

9. The method of claim 1, wherein instructing, by the user device, the ICAE instance to disable the media file based upon the unique code being invalid comprises instructing, by the user device, the ICAE instance to corrupt the media file rendering the media file unplayable.

10. The method of claim 1, wherein instructing, by the user device, the ICAE instance to disable the media file based upon the unique code being invalid comprises instructing, by the user device, the ICAE instance to render the media file unrecognizable during playback.

11. The method of claim 1, further comprising:
    determining, by the user device, a user device location;
    requesting, by the user device, a media content playback device location from the media content playback device;
    receiving, by the user device, the media content playback device location from the media content playback device;
    comparing, by the user device, the user device location and the media content playback device location to determine whether a location discrepancy exists; and
    in response to determining that the location discrepancy exists, instructing, by the user device, the ICAE instance to disable the media file.

12. The method of claim 11, wherein the location discrepancy is defined, at least in part, by a location rule.

13. A user device comprising:
    a processor; and
    a memory having instructions stored thereon that, when executed by the processor, cause the processor to perform operations comprising
    receiving a notification that a media content playback device has requested playback of a media file that is protected by an intelligent continuous authentication engine ("ICAE") instance,
    requesting a unique code from the media content playback device, wherein the unique code is associated with the ICAE instance and the media file,
    providing the unique code to an ICAE central management system associated with a media content provider that provides media content encompassed in the media file,
    determining, based upon a result provided by the ICAE central management system, whether the unique code is valid or invalid, and
    instructing the ICAE instance to enable or disable the media file based upon whether the unique code is valid or invalid.

14. The user device of claim 13, wherein the unique code comprises a static code or a dynamic code associated with the media file.

15. The user device of claim 14, wherein the unique code is viable for a single playback session of the media file or multiple playback sessions of the media file.

16. The user device of claim 13, wherein instructing the ICAE instance to disable the media file based upon the unique code being invalid comprises:

instructing the ICAE instance to delete the media file;
instructing the ICAE instance to interrupt the media content playback device from streaming the media file;
instructing the ICAE instance to corrupt the media file rendering the media file unplayable; or
instructing the ICAE instance to render the media file unrecognizable during playback.

17. The user device of claim 13, wherein the operations further comprise:
determining a user device location;
requesting a media content playback device location from the media content playback device;
receiving the media content playback device location from the media content playback device;
comparing the user device location and the media content playback device location to determine whether a location discrepancy exists, wherein the location discrepancy is defined, at least in part, by a location rule; and
in response to determining that the location discrepancy exists, instructing the ICAE instance to disable the media file.

18. A computer-readable storage medium having computer-executable instructions stored thereon that, when executed by a processor of a user device, cause the processor to perform operations comprising:
receiving a notification that a media content playback device has requested playback of a media file that is protected by an intelligent continuous authentication engine ("ICAE") instance;
requesting a unique code from the media content playback device, wherein the unique code is associated with the ICAE instance and the media file;
providing the unique code to an ICAE central management system associated with a media content provider that provides media content encompassed in the media file;
determining, based upon a result provided by the ICAE central management system, whether the unique code is valid or invalid; and
instructing the ICAE instance to enable or disable the media file based upon whether the unique code is valid or invalid.

19. The computer-readable storage medium of claim 18, wherein instructing the ICAE instance to disable the media file based upon the unique code being invalid comprises:
instructing the ICAE instance to delete the media file;
instructing the ICAE instance to interrupt the media content playback device from streaming the media file;
instructing the ICAE instance to corrupt the media file rendering the media file unplayable; or
instructing the ICAE instance to render the media file unrecognizable during playback.

20. The computer-readable storage medium of claim 18, wherein the operations further comprise:
determining a user device location;
requesting a media content playback device location from the media content playback device;
receiving the media content playback device location from the media content playback device;
comparing the user device location and the media content playback device location to determine whether a location discrepancy exists, wherein the location discrepancy is defined, at least in part, by a location rule; and
in response to determining that the location discrepancy exists, instructing the ICAE instance to disable the media file.

* * * * *